United States Patent [19]

Aruga et al.

[11] Patent Number: 5,729,804
[45] Date of Patent: Mar. 17, 1998

[54] TONER STORAGE DEVICE AND SUPPLY MECHANISM FOR IMAGE FORMING

[75] Inventors: Tomoe Aruga; Kiyoharu Momose; Junichi Okada; Junichiro Shinozaki; Yoshiro Koga; Hiroshi Niki; Toshiaki Ohno, all of Nagano, Japan

[73] Assignee: Seiko Epson Corporation, Tokyo, Japan

[21] Appl. No.: 581,642

[22] Filed: Dec. 28, 1995

Related U.S. Application Data

[62] Division of Ser. No. 285,465, Aug. 3, 1994, Pat. No. 5,537,191.

[30] Foreign Application Priority Data

| Aug. 5, 1993 | [JP] | Japan | 5-194957 |
| Aug. 11, 1993 | [JP] | Japan | 5-219059 |
| Oct. 19, 1993 | [JP] | Japan | 5-284474 |

[51] Int. Cl.⁶ ............................................. G03G 15/08
[52] U.S. Cl. ............................... 399/263; 222/DIG. 1
[58] Field of Search .................................. 355/245, 260; 222/325, DIG. 1; 141/205, 363; 399/258, 263, 255, 254

[56] References Cited

U.S. PATENT DOCUMENTS

| 3,135,433 | 6/1964 | Mayo et al. ........................ 222/227 |
| 3,700,328 | 10/1972 | Davidge et al. . | |
| 4,011,835 | 3/1977 | Lewis . | |
| 5,012,285 | 4/1991 | Oka et al. .......................... 355/245 |
| 5,134,441 | 7/1992 | Nagata et al. ....................... 355/245 |
| 5,184,184 | 2/1993 | Hayashi et al. .................... 355/296 |
| 5,345,297 | 9/1994 | Katakabe et al. ................... 355/260 |

FOREIGN PATENT DOCUMENTS

| 0018141 | 10/1980 | European Pat. Off. . |
| 0249928 | 12/1987 | European Pat. Off. . |
| 0412923 A2 | 2/1991 | European Pat. Off. . |
| 58-107572 | 6/1983 | Japan . |
| 61-50180 | 3/1986 | Japan . |
| 63-246780 | 10/1988 | Japan . |
| 2-134669 | 5/1990 | Japan . |
| 6-175543 | 6/1994 | Japan . |
| 6-161331 | 6/1994 | Japan . |
| 2242542 | 10/1991 | United Kingdom . |

*Primary Examiner*—Joan H. Pendegrass
*Attorney, Agent, or Firm*—Stroock & Stroock & Lavan LLP

[57] ABSTRACT

An endless toner transport which connects a developing device with a cleaning device is disposed so as to pass through these devices in their respective longitudinal directions. The mixing of toner can be enhanced by returning recovered toner to the developing device and by supplying fresh toner to the cleaning device by using the toner transport itself, whereby the reuse of recovered toner and the reduction of the quantity of fresh toner used can be conducted more effectively. In the processes of transporting toner from the developing device to the cleaning device and from the cleaning device to the developing device, toner can effectively be stirred and mixed by utilizing oscillation or the like generated in the endless toner transport which can be in the form of a coil spring so that an additional stirring member is not required, thereby allowing the developing device, and hence the entire image forming apparatus, to be greatly reduced in size.

22 Claims, 22 Drawing Sheets

FIG. 8(a)
FIG. 8(b)
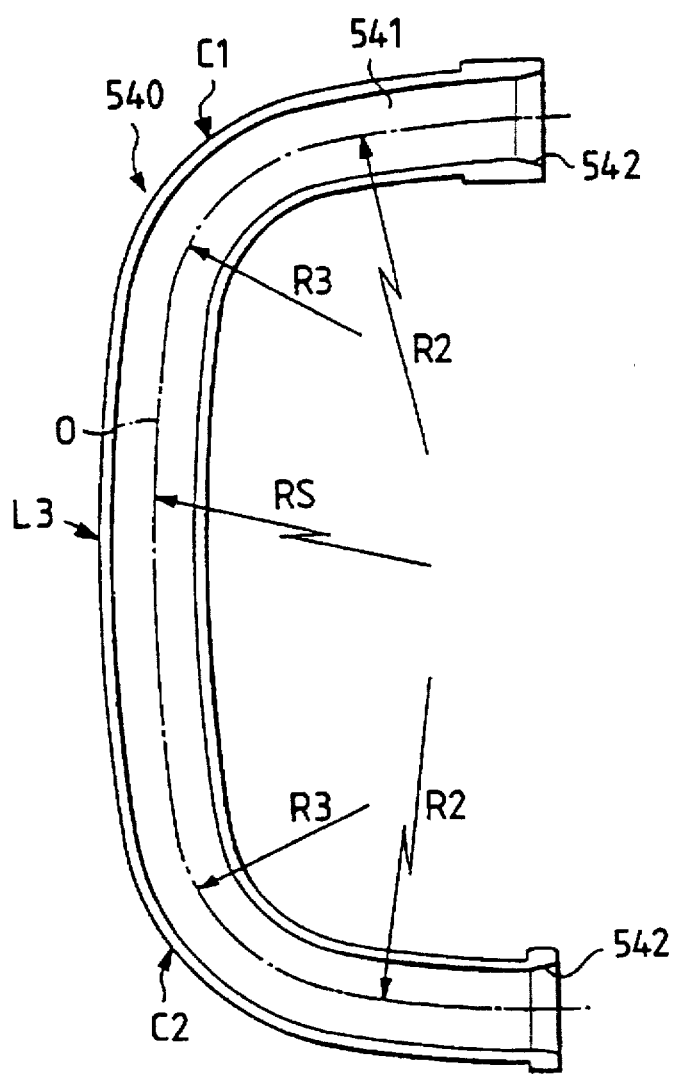
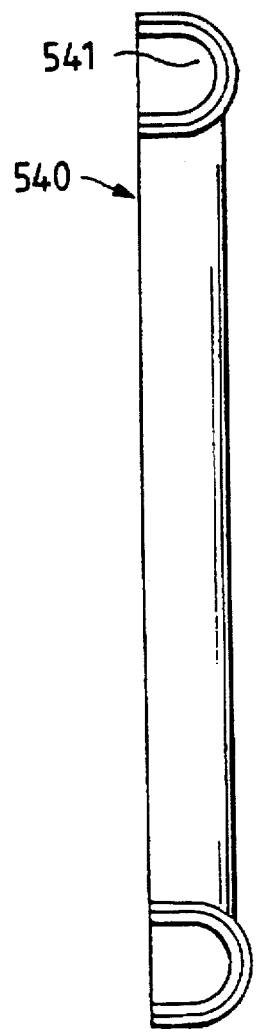

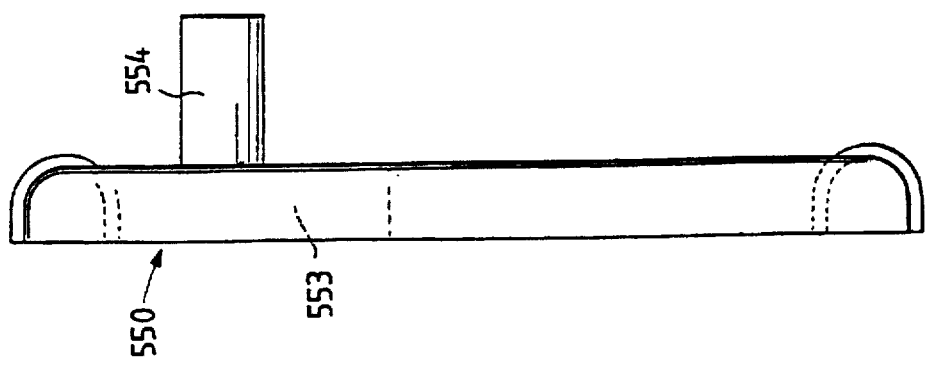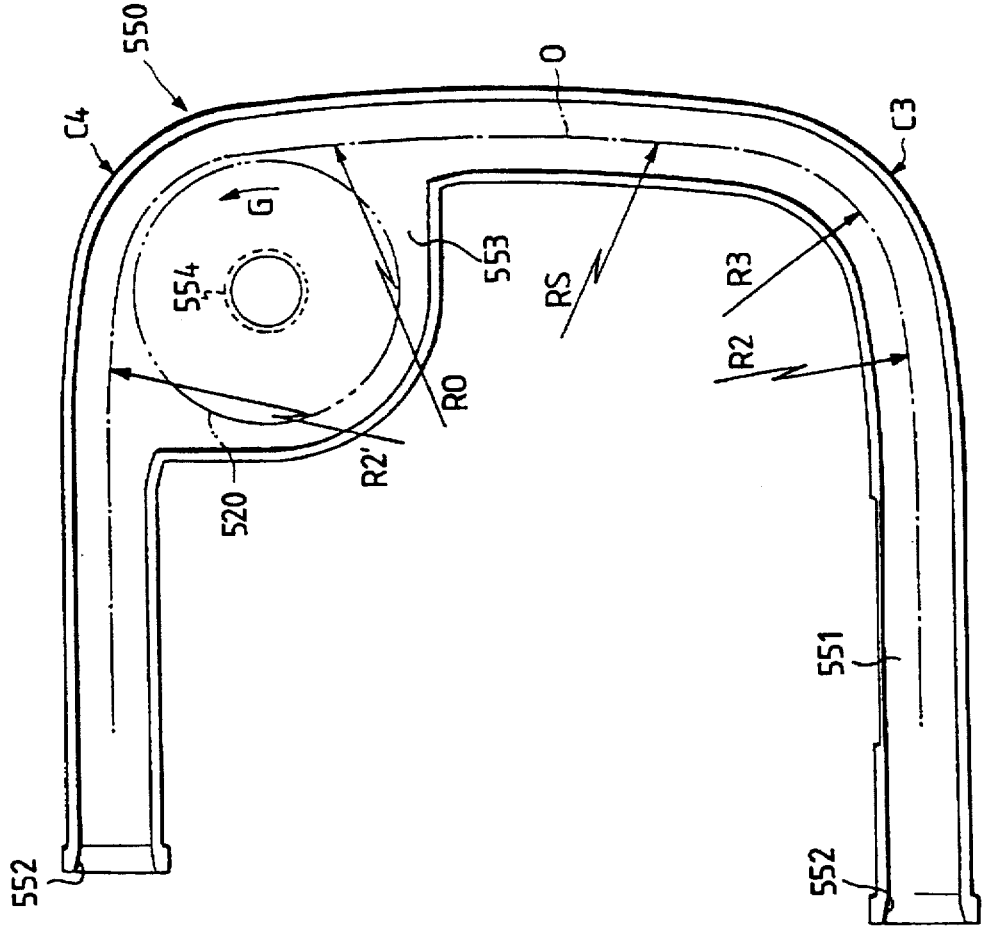

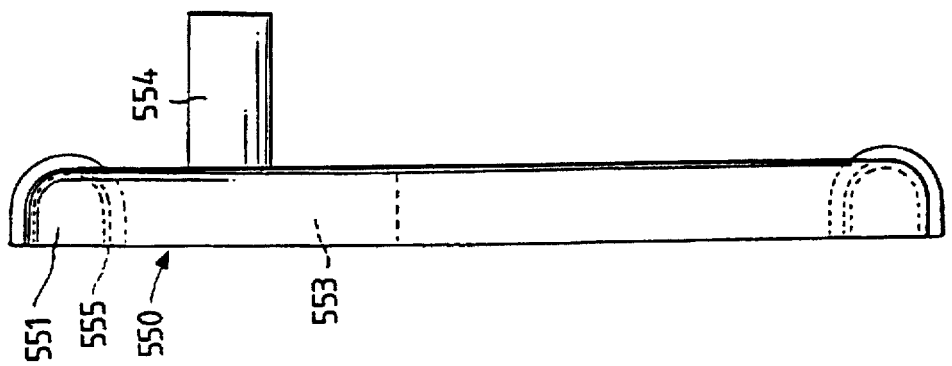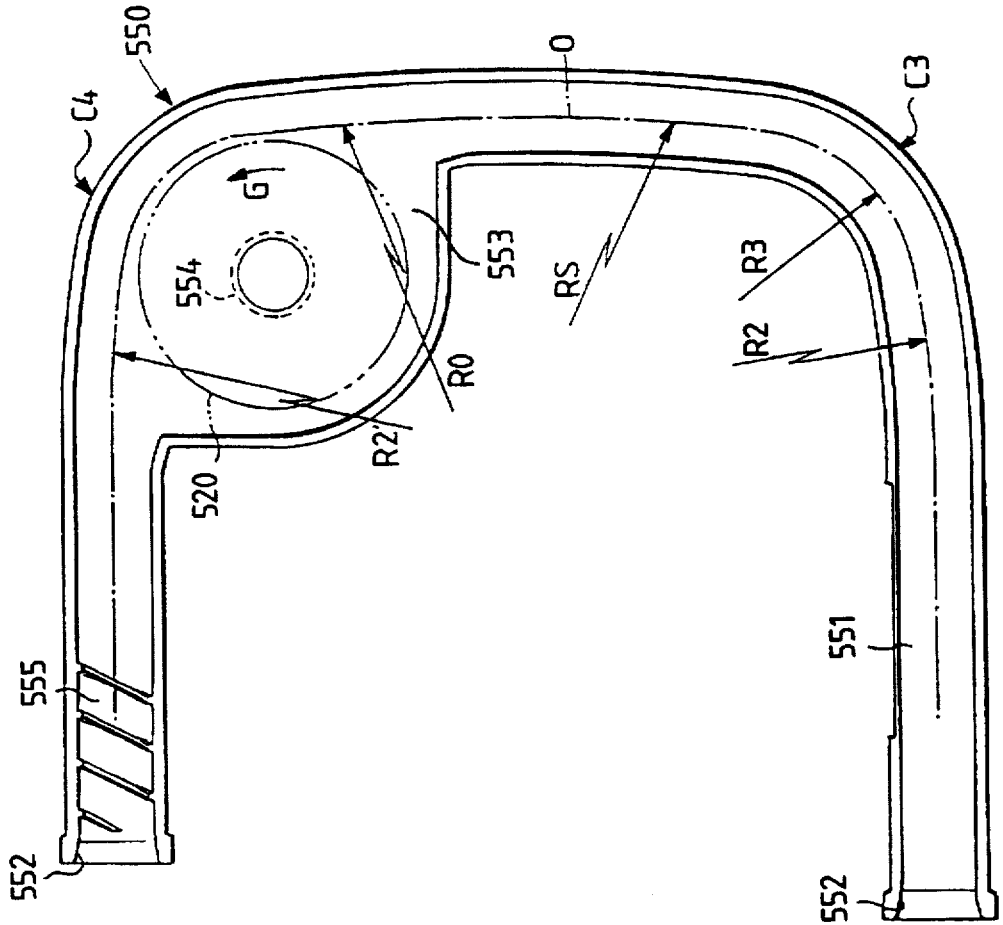

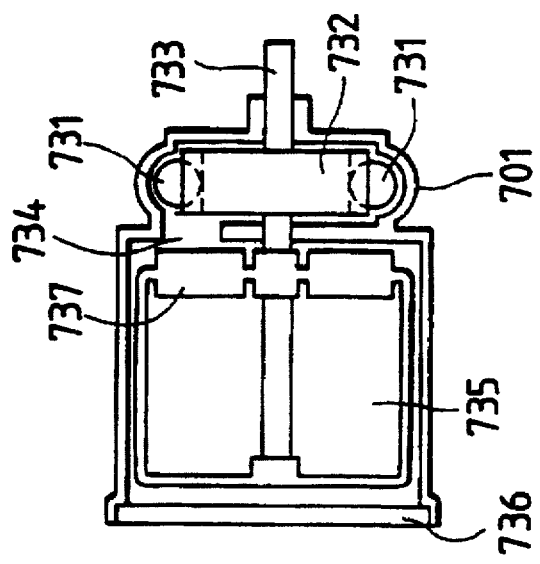
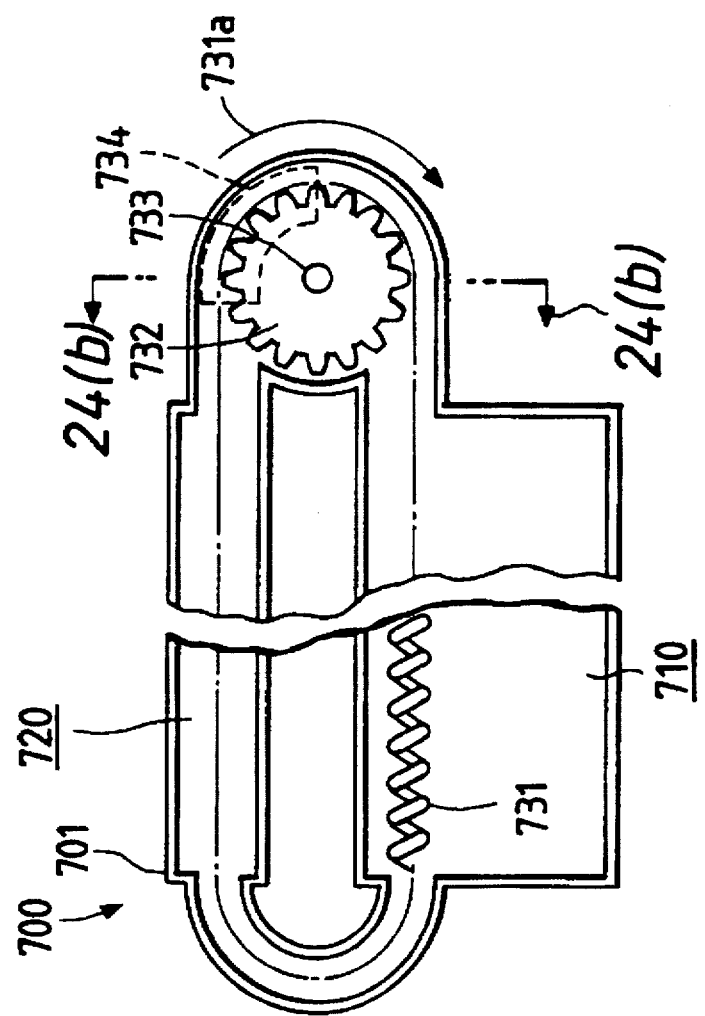
FIG. 24(a)
FIG. 24(b)

TONER STORAGE DEVICE AND SUPPLY MECHANISM FOR IMAGE FORMING

CROSS-REFERENCE TO RELATED APPLICATIONS

This is a divisional application of prior application Ser. No. 08/285,465, filed on Aug. 3, 1994, entitled IMAGE FORMING APPARATUS, now U.S. Pat. No. 5,537,191, issued Jul. 16, 1996.

BACKGROUND OF THE INVENTION

1. Field of the Invention

The present invention relates generally to an image forming apparatus such as a copier, a facsimile apparatus, or a printer which employs the electrophotography technique.

Furthermore, the invention also relates generally to a toner tank for supplying toner from the outside to an image forming apparatus.

2. Related Art

Generally in a developing device using toner, a latent image formed on a surface of a photosensitive body in accordance with recording information must be provided. A toner supply container must be provided which is comparable in length to that of the developing device to supply toner uniformly and continuously at a uniform density to the entire effective image area. Thus, the toner supply container occupies a substantially large space within the machine. A further space (a cleaning unit) for collecting and storing unused toner supplied to the effective image area must be provided separately.

Japanese Patent Publication (Kokoku) No. SHO52-382 discloses a novel way to cope with this space problem. This technique employs a toner transport mechanism which circulates in a path which includes a developing unit and a cleaning unit. A magnetic brush for recovering toner is formed by carriers transported to the cleaning unit by the transporting mechanism. Toner which has been recovered from a surface of a photosensitive drum which was not transferred (hereinafter untransferred toner) is returned to the developing unit to be reused. The technique is advantageous in that the quantity of new toner which must be supplied can be reduced, and that the space for storing recovered toner can be reduced in size.

However, since recovered toner and fresh toner must be stirred and mixed in this apparatus, an agitator and a toner hopper for supplying fresh toner must be provided with the developing unit. In this respect, there is a limit in device size reduction and in device layout freedom.

Another known toner transport mechanism has a configuration shown in FIG. 30 (Japanese Patent Publication (Kokai) No. SHO63-246780). FIG. 30(a) is a plan view of the device, FIG. 30(b) is a fragmentary cross sectional view taken along lines 30(b)—30(b) of FIG. 30(a), FIG. 30(c) is a fragmentary cross sectional view taken along lines 30(c)—30(c) of FIG. 30(a), and FIG. 30(d) is a cross sectional view taken along lines 30(d)—30(d) of FIG. 30(a).

As shown in these figures, the toner transport mechanism comprises a strip member 24, and toner removing device L. The strip member 24 is elongated and is circulated between the interior of a developing device M for supplying toner to a surface of a photosensitive drum 23. The developing device develops an image on the surface of the photosensitive drum 23 to form a toner image, and the interior of a cleaning device N removes and recovers residual toner, which adheres to the surface of the photosensitive drum 23 after the toner image formed by the developing device M is transferred to a sheet. The toner removing device L removes residual toner adhering to the surface of the strip member 24 in the cleaning device N.

The strip member 24 is composed of sponge made of a porous elastic body. A reinforcing core member 25 is embedded in the center portion of the strip member. The strip member 24 passes through the interior of covers 26a and 26b which extend between a body case 32 of the developing device M and a body case 34 of the cleaning device N. Strip member 24 is supported in a circulatable manner by a driving pulley 27a and driven pulleys 27b, 27c and 27d, so as to be circulated in the direction indicated by arrow 28 by driving pulley 27a. As more particularly shown in FIG. 30b, driving pulley 27a is coupled to a shaft 27e supporting a drive gear 29, in turn coupled to motor 30.

The toner removing device L, is formed of a plurality of blades 31 arranged in body case 32 of the developing device, so as to oppose each other across the strip member 24 which runs in the direction indicated by arrow 8 inside body case 32. A semicircular notch 31a is formed in the front end portion of each of the blades 31 which engage with the surface of strip member 24.

In the toner transport mechanism having this configuration, a developing roller 33 disposed in the developing device M is rotated to cause toner to be supplied to the surface of the photosensitive drum 23. The toner adheres to a latent image which is electrostatically formed on the surface of the photosensitive drum 23, thereby forming a toner image. After the toner image is transferred to a sheet which is not shown, residual toner adhering to the surface of photosensitive drum 23 is scraped off by a cleaning blade 35 disposed in cleaning device N so as to slidably contact the surface of photosensitive drum 23. The residual toner recovered by the scraping operation adheres to the surface of the strip member 24 and is transported from the interior of the cleaning device N to the interior of the developing device M through the interior of cover 26b. The toner is then scraped off by blades 31 into body case 32 of developing device M. Strip member 24 from which the residual toner has been scraped off is circulated in the direction indicated by arrow 28 to proceed again toward the interior of the cleaning device N.

However, this toner transport mechanism has the following problems:

(a) Strip member 24 is composed of sponge made of a porous elastic body. Toner is transported by adhering to the surface (mainly to a number of pores) of the sponge. This is not an efficient way to transfer toner.

(b) Toner adhering to the surface of strip member 24 is scraped off by blades 31. When strip member 24 is not sufficiently scraped by blades 31, the pores on the surface of strip member 24 clog with toner so that transportation of the toner is even less efficient.

(c) Toner adhering to the surface of strip member 24 is scraped off by blades 31 disposed inside developing device M. This requires the developing device to be relatively larger and complicated. In turn the entire image forming apparatus must be enlarged to the same degree as the developing device must be enlarged.

In addition, other problems with the prior art arise. Powdered toner used in the image forming apparatus increases in density if allowed to stand unagitated for a long period, and easily solidifies. It is more difficult to supply toner to the image forming apparatus once it solidifies. As a result the obtained images are blurred, and the print quality is impaired. Therefore, while supplying toner to the image forming apparatus during printing, the toner must be stirred to prevent solidification.

FIG. 31(a) shows an example of a toner tank. During the printing process, agitators 42 disposed in toner container 41 rotate in the direction indicated by arrows L and stir toner (not shown) contained in toner container 41, breaking blocks of toner and improving the fluidity of the toner. Furthermore, the rotation of agitators 42 supplies toner through a toner supply port 41-1 to an image forming apparatus (not shown) which is located below container 41.

FIG. 31(b) is a cross-sectional view of the toner tank of FIG. 31(a). The outer periphery of rotation loci of the agitators 42 is shown by two-dot chain lines, 43. The hatched portion O in FIG. 31(b) is outside the rotation loci of the agitators 42, and toner in this hatched portion O is hardly stirred.

Thus, toner is unevenly stirred and blocks of toner are liable to remain unbroken in the toner tank. This causes an insufficient amount of toner to be supplied to the image forming apparatus, resulting in blurred images and impaired print quality. In addition, excess toner will collect in the hatched portion O outside the rotation loci of agitators 42. Since the bottom of the toner container is substantially horizontal, this toner is unusable, and is wasted. Wasting this toner which will not be supplied to the image forming apparatus is uneconomical.

SUMMARY OF THE INVENTION

Generally speaking, in accordance with the present invention an image forming apparatus is provided in which devices for developing and cleaning, along with other image forming process mechanisms are disposed in near proximity to a electrostatic latent image holding mechanism. The apparatus further includes an endless toner transport mechanism disposed along a transport path which passes through the developing and the cleaning devices in their respective longitudinal directions, and a toner supply mechanism disposed at a location along the transport path of the endless toner transport mechanism other than where the developing or cleaning devices are disposed. Preferably, the toner supply mechanism is disposed along the upstream side of the developing device along the transport path of the endless toner transport mechanism. Alternatively, the toner supply mechanism may be disposed along the downstream side.

Preferably, the toner tank contains a stirring-up vane for stirring toner upward in the toner tank operatively coupled to a rotating shaft which also functions as a rotating shaft for the driving device for the endless toner transport mechanism.

It is a primary object of the invention to provide a novel image forming apparatus in which the quantity of toner consumed can be reduced and the degree of freedom in the layout of the apparatus can be increased, whereby the apparatus can be further miniaturized.

It is another object of the invention to provide a toner transport mechanism which has a simpler structure and can transport toner more efficiently.

It is a further object of the invention to provide a smaller toner tank in which toner is more easily and evenly stirred and which obtains excellent print quality free from printing blur and reduces the quantity of unused toner in a toner container.

Still other objects and advantages of the invention will in part be obvious and will in part be apparent from the specification.

The invention accordingly comprises the features of construction, combination of elements and elements and arrangements of parts which will be exemplified in the constructions hereinafter set forth and the scope of the invention will be indicated in the claims.

BRIEF DESCRIPTION OF THE DRAWINGS

FIG. 8(a) is a front plan view showing a guiding member used in the first embodiment of the invention, FIG. 8(b) is a side elevational view thereof;

FIG. 9(a) is a front plan view showing another guiding member used in the first embodiment of the invention, and FIG. 9(b) is a side elevation view thereof;

FIG. 13(a) is a front plan view showing another modification of the outer of the guiding members, and FIG. 13(b) is a side elevation view-thereof;

FIG. 24(a) is a diagrammatic plan view showing a toner transport mechanism, and a toner tank of a fifth embodiment of the invention, and FIG. 24(b) is a cross-sectional view taken along lines 24(b)—24(b) of FIG. 24(a);

DETAILED DESCRIPTION OF THE PREFERRED EMBODIMENTS

Figure 1:
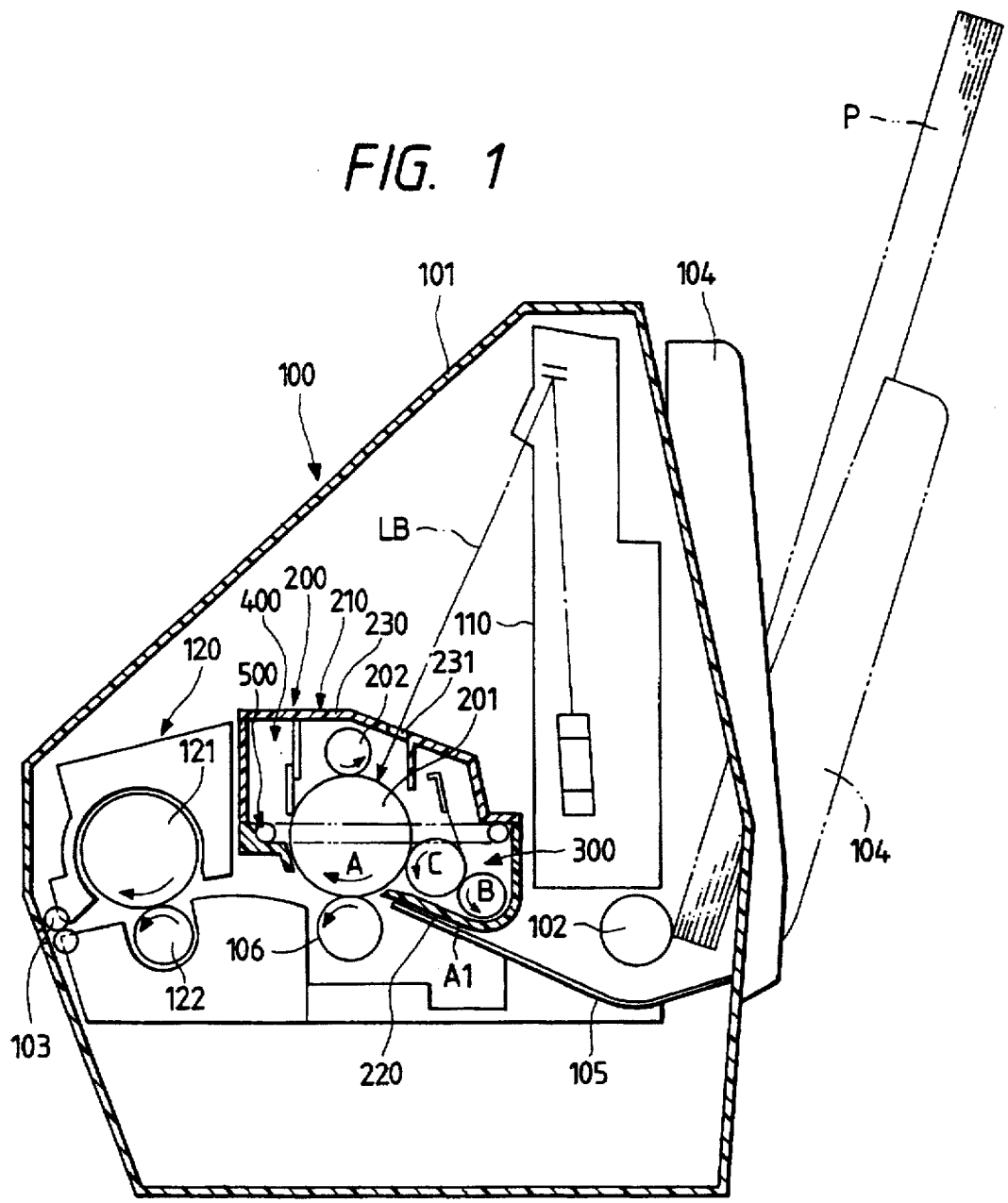
FIG. 1 is a cross-sectional view showing the configuration of a printer showing an image forming apparatus according to a first embodiment of the invention.

Reference is made to FIG. 1 of the drawings which depicts an image forming apparatus constructed in accordance with a first embodiment of the present invention. In this embodiment, like parts are given like reference numerals.

In the figure, 100 designates generally the body of the printer. Within a case 101 of the body are contained a sheet supply roller 102, an optical unit 110, an image forming unit 200 which constitutes the image forming apparatus, a fixing unit 120, and sheet discharging rollers 103.

A sheet supply tray 104 is pivotably attached to the back of the case 101. When not in use, sheet supply tray 104 is folded as indicated by the solid lines so as to contact with the back of the case, and, when used, it is opened as indicated by phantom lines.

Sheets P are set in the sheet supply tray 104, and then supplied into the case one by one by the sheet supply roller 102.

The supplied sheet passes through a sheet supply path A1 defined by a sheet guide 105 and the lower face of case 210 of the image forming unit 200, and enters a space between a transfer roller 106 and a photosensitive drum 201 on which a toner image is formed as described later. The toner image is transferred here from the photosensitive drum 201 to the sheet. The sheet then passes through a space between a fixing roller 121 and a pressure roller 122 in the fixing unit 120 so that the toner image is fixed to the sheet. The sheet is finally discharged by the sheet discharging rollers 103 to the outside of the case.

As shown in FIGS. 2 to 5, the image forming unit shown generally as 200 has a unitary construction comprising the photosensitive drum 201 which is a photosensitive member, a charging roller 202, a developing device shown generally as 300, a cleaning device shown generally as 400, and a toner transport mechanism shown generally as 500 which are housed in a case 210.

The photosensitive drum 201 has a configuration in which a photosensitive layer made of an organic photosensitive material is formed on a conductive substrate consisting of an aluminum drum. The photosensitive drum 201 is rotatably supported by the case 210, and rotated in the direction indicated by arrow A by a driving mechanism which is not shown.

The charging roller 202 is pressed against the photosensitive drum 201 by a pressing mechanism which is not shown, and charges the photosensitive drum 201 while being rotated by the photosensitive drum 201. A bias voltage is applied to the charging roller 202.

The charged photosensitive drum 201 is scanned by a laser beam LB generated by the optical unit 110 shown in FIG. 1, whereby a latent image is formed on the surface of the photosensitive drum 201.

Figure 5:
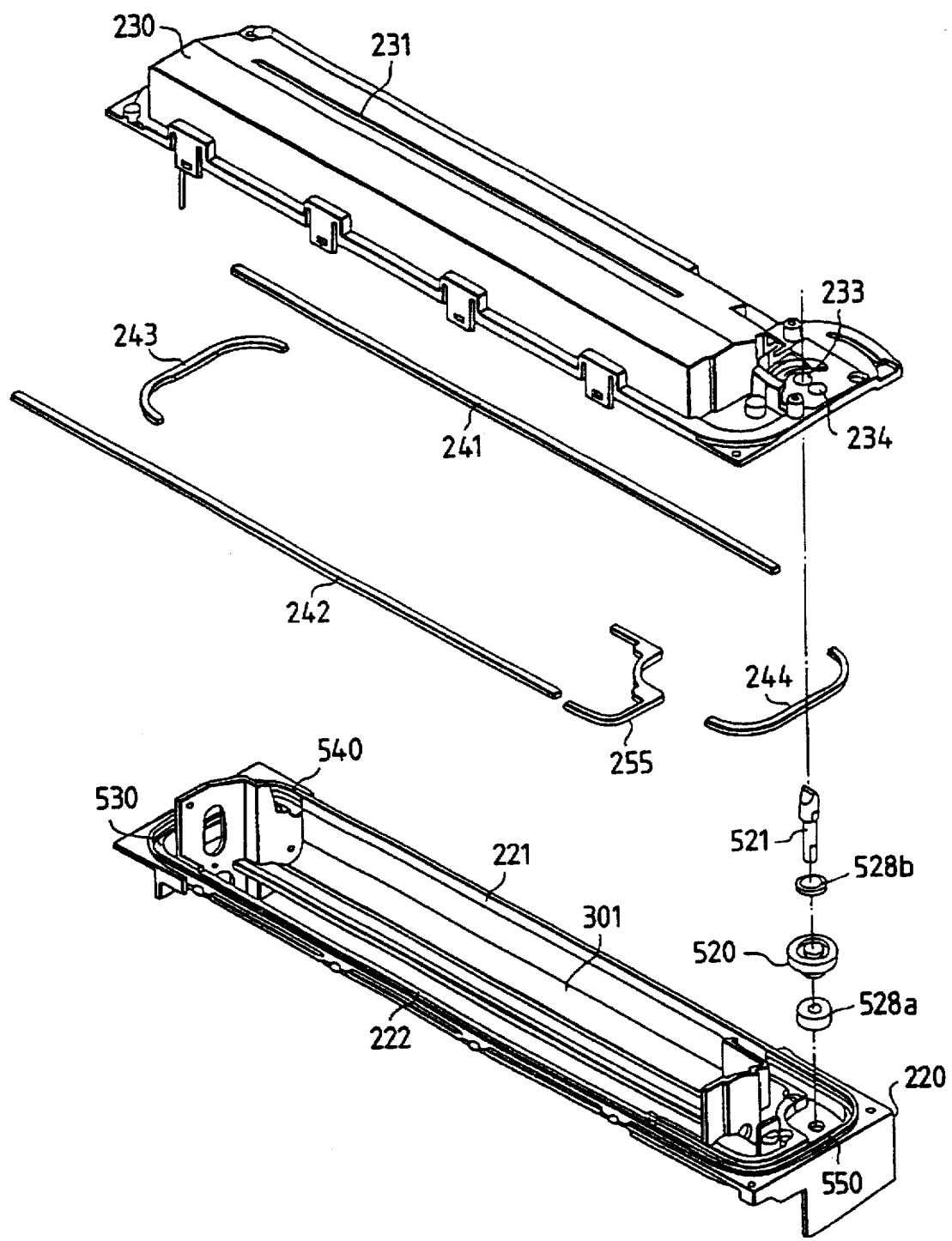
FIG. 5 is an exploded perspective view showing upper and lower cases used in the first embodiment of the invention.

The case 210 consists of a lower case 220 and an upper case 230 as shown in FIG. 5. A slit 231 for the beam scan is formed in the upper case 230.

Figure 3:
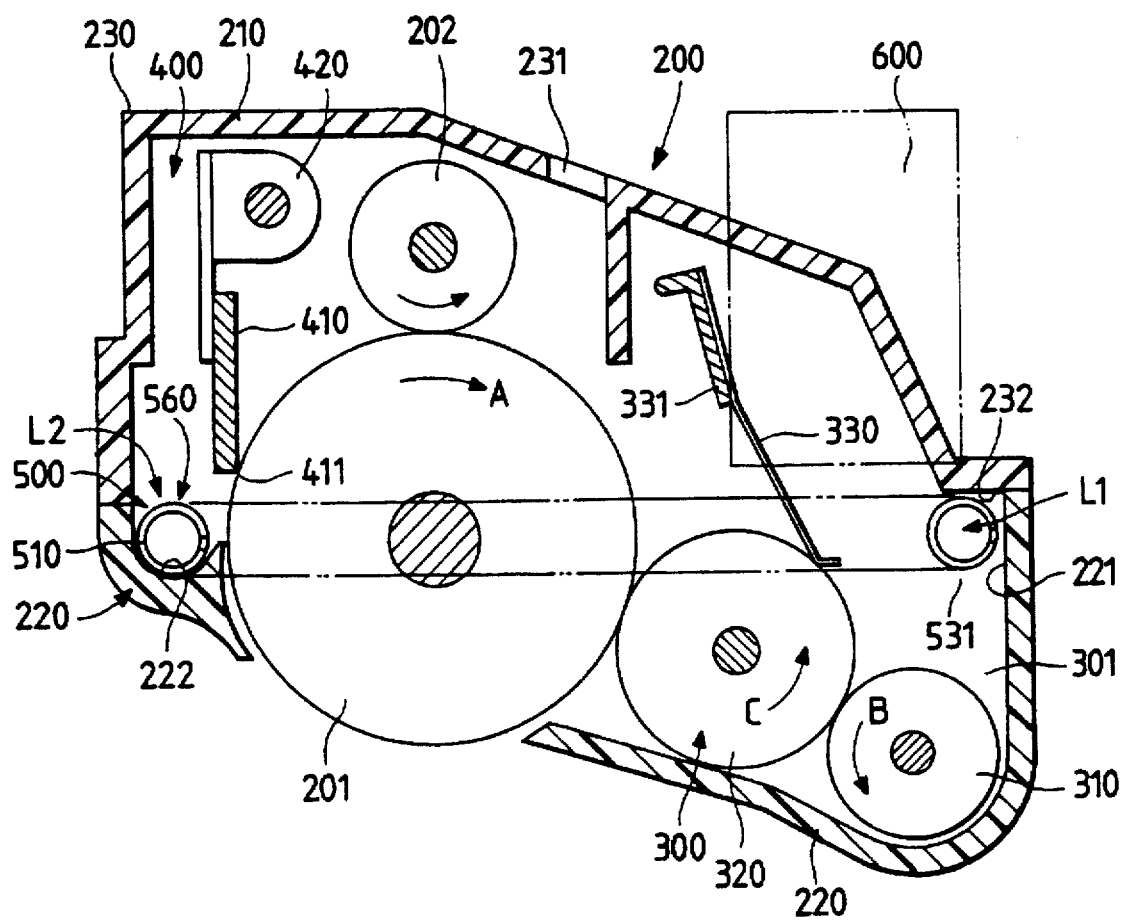
FIG. 3 is a cross-sectional view of the image forming apparatus of FIG. 2 taken along lines 3—3 of FIG. 2.

As is shown in FIG. 3, the developing device 300 comprises a toner reservoir 301 which is formed by the lower case 220 in the longitudinal direction of the lower case, a supply roller 310 which is rotatably disposed in the toner reservoir 301, a developing roller 320 which is rotatably disposed in the same manner, and a regulation blade 330 which contacts with the peripheral face of the developing roller 320. The supply roller 310 and the developing roller 320 are respectively rotated in the directions indicated by arrows B and C by a driving mechanism (not shown) which is interlocked with the driving mechanism for the photosensitive drum 201. The regulation blade 330 is composed of an elastic body such as a stainless steel plate, and is attached to the upper case 230 by an attaching member 331.

The supply roller 310 rotates and stirs the toner contained in the toner reservoir 301, so that the surface of the developing roller 320 is coated with toner. The toner on the surface of the developing roller 320 is slidingly contacted with the regulation blade 330 and is formed into a thin film which is frictionally electrified. A bias voltage is applied to the developing roller 320. The thinned toner is transported toward the photosensitive drum 201. In a nip zone constituted by the contacting area between the developing roller 320 and the photosensitive drum 201, the toner is then adhered to a latent image on the photosensitive drum 201, whereby the latent image on the surface on the photosensitive drum 201 is developed to form a toner image.

The toner image formed on the surface of the photosensitive drum 201 is then transferred to the sheet P which is transported while being sandwiched between the photosensitive drum 201 and the transfer roller 106 (see FIG. 1) to which a bias voltage of polarity opposite to the polarity of the toner image is applied.

The cleaning device indicated generally as 400 comprises a cleaning blade 410 which is attached to the upper case 230 by an attaching member 420. The lower edge 411 of the cleaning blade 410 is pressingly contacted with the peripheral face of the photosensitive drum 201, so that residual toner which remains adhered to the surface of the photosensitive drum 201 after the toner image has been transferred to the sheet is scraped off toward a toner recovery portion 560 of the toner transport mechanism 500. The toner recovery portion 560 will be described later.

After the photosensitive drum 201 is cleaned by scraping off the residual toner, the image forming process is performed again, as is described above.

Figure 2:
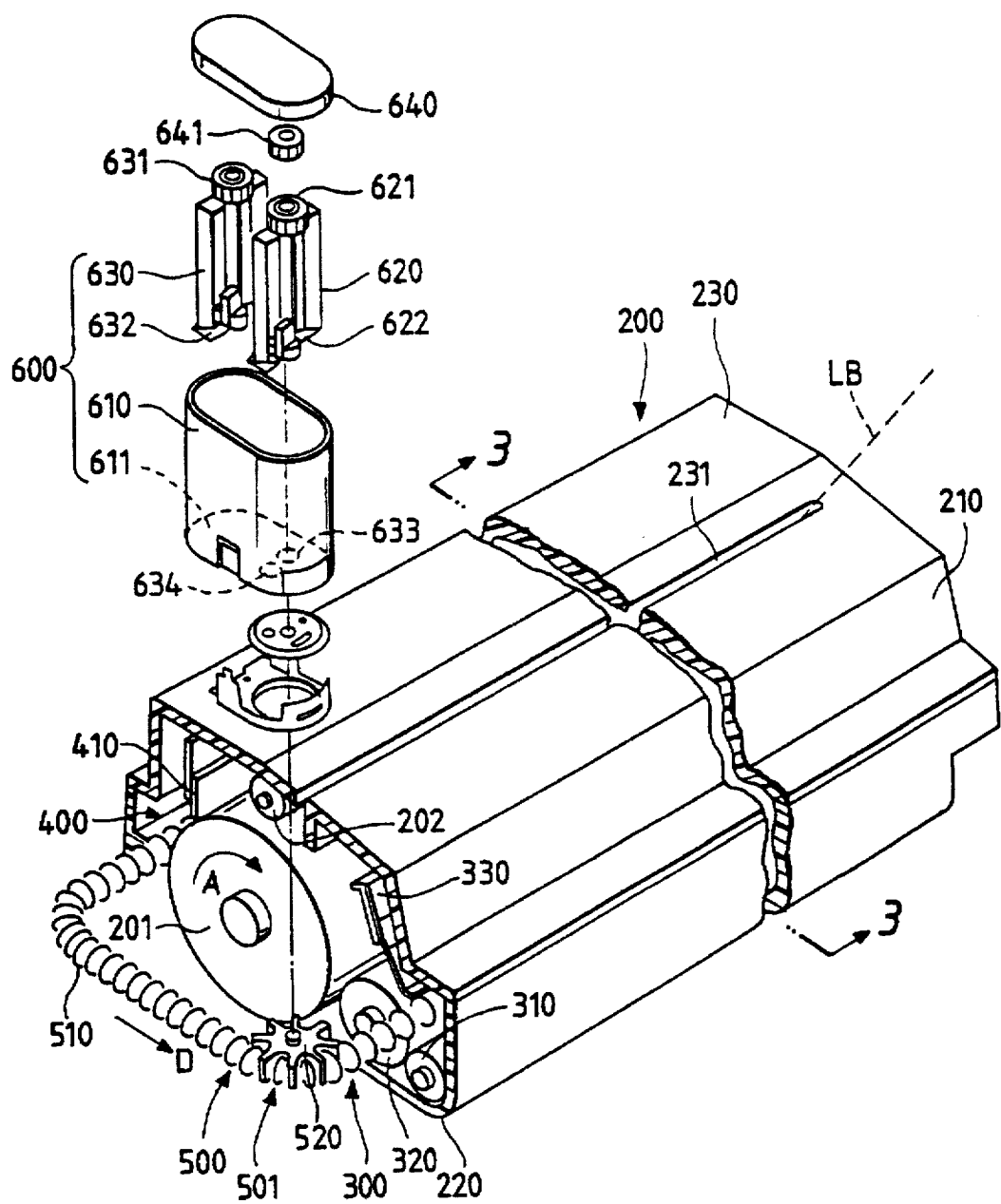
FIG. 2 is a fragmentary exploded perspective view showing the image forming apparatus, the toner transport mechanism, and the toner tank according to a first embodiment of the invention.

As is shown in FIG. 2 the toner transport mechanism 500 is disposed along a transport path which passes through the interior of developing device 300 and the cleaning device 400. The toner transport mechanism comprises a coil spring 510, a driving gear 520 which engages with the coil spring 510 and which drives the spring, and a channel-like guide portion 530 (see FIG. 7) which contacts with the coil spring 510 to guide it.

Figure 6C:
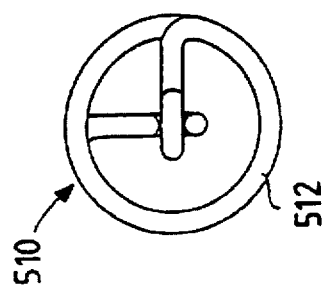
FIG. 6(c) is a right side elevation view thereof.
Figure 6A:
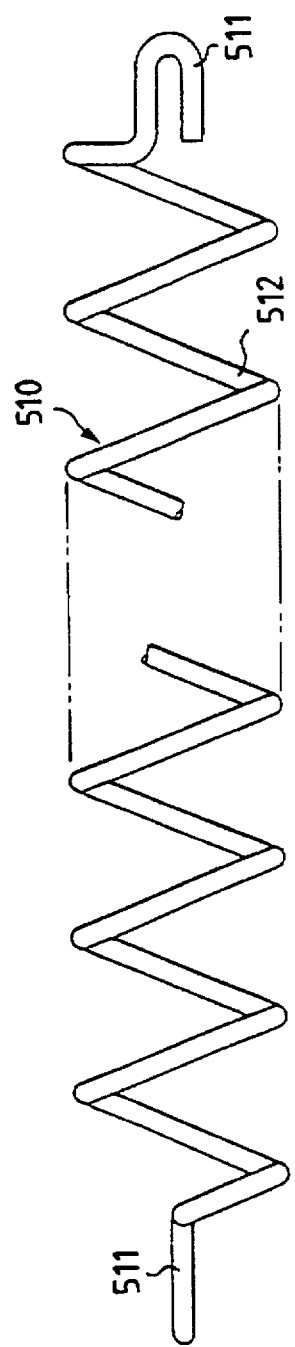
FIG. 6(a) is a partially cutaway plan view showing a coil spring used in the first embodiment of the invention.
Figure 6B:
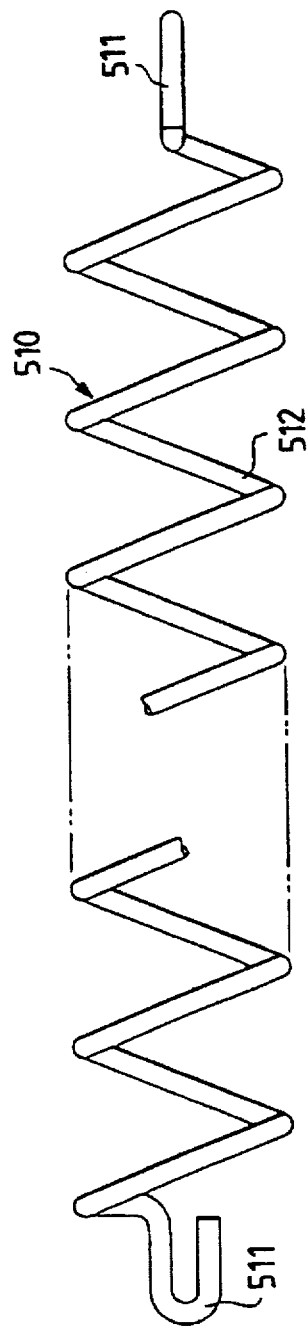
FIG. 6(b) is a partially cutaway front view thereof.

As shown in FIG. 6, the coil spring 510 is formed of continuous wire 512 and has hooks 511 at each end formed from the wire, and is configured so as to constitute an endless spring when the hooks 511 are coupled to each other. When the hooks of the coil spring 510 are coupled, the endless spring normally forms into a circular ring shape. In the coil spring 510, the diameter of the element wire 512 is 0.2 to 1.0 mm, preferably 0.3 to 0.6 mm, and the pitch is 1.0 mm or more, preferably 2.0 mm or more.

In order to reduce the friction resistance between the coil spring 510 and the guide portion 530, at least the outer peripheral face (or the portion slidingly contacting with the guide portion 530) of the coil spring 510 is preferably coated with a coating material such as a fluororesin which has a small friction coefficient.

The driving gear 520 consists of a spur gear as shown in FIG. 2, and is driven by a driving mechanism (not shown) which is interlocked with the driving mechanism for the photosensitive drum 201 (not shown), to drive the coil spring 510 in the direction indicated by arrow D.

Figure 7:
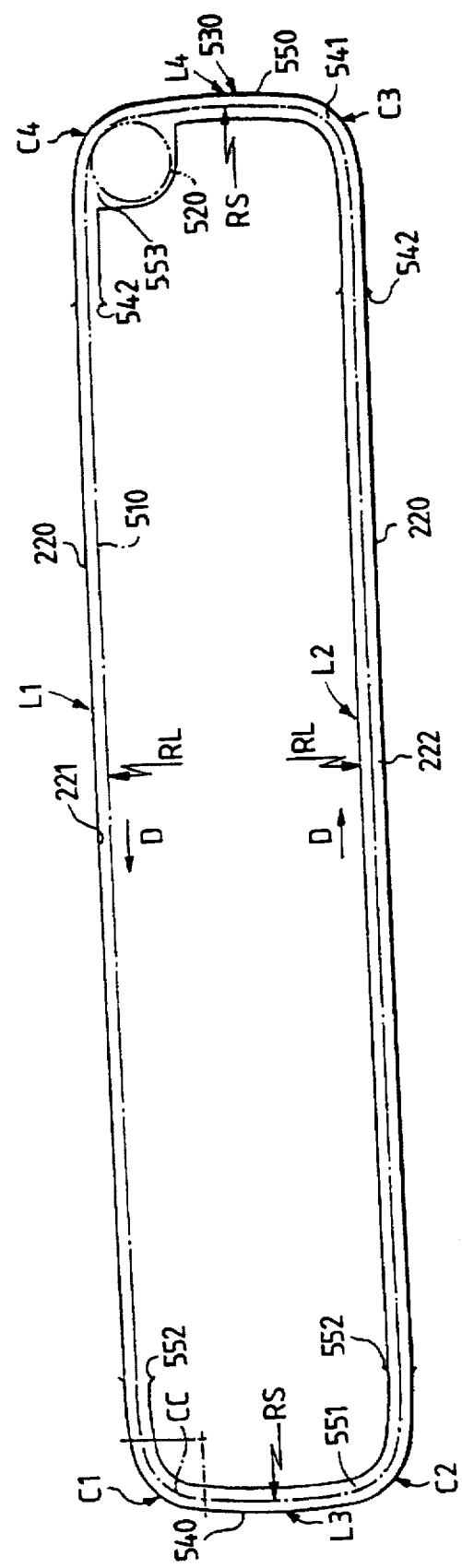
FIG. 7 is a diagrammatic plan view showing the toner transport path and guide portion used in the first embodiment of the invention.

FIG. 7 is a diagrammatic plan view showing the whole of the guide portion 530. The figure substantially shows the circulation path of the coil spring 510.

As is seen from FIG. 7, upon placing coil spring 510 into guide portion 530, coil spring 510 which is normally of circular ring shape is formed into a substantially rectangular shape. Specifically, the guide portion 530 consists of four corners C1, C2, C3 and C4, each having a substantially quadrant shape, and substantially linear portions L1, L2, L3 and L4 for connecting the corners C1, C2, C3 and C4.

The substantially linear portions (hereinafter, referred to as merely "linear portions") L1, L2, L3 and L4 may be configured so as to have a straight shape. Alternatively, the linear portions may be configured so as to have an arcuate shape that has a large curvature and swells outside a line circumscribing quadrants CC, each of which constitutes the center line of the respective corner. In a first embodiment, the linear portions have an arcuate shape. The curvature RL of the arcs constituting the long edge linear portions L1 and L2 is greater than the curvature RS of the arcs constituting the short edge linear portions L3 and L4.

The friction resistance between the guide portion 530 and the coil spring 510, which is guided by the guide portion 530, is less in the long edge portions L1 and L2, and greater in the corners C1, C2, C2 and C4 and the short edge portions L3 and L4. Particularly, the friction resistance has the largest value in the corners.

In order to reduce the friction resistance between the coil spring 510 and the guide portion 530 in the corners C1, C2, C3 and C4 where the friction resistance exhibits the largest value, at least the faces of guide portion 530 to which the coil spring 510 slidingly contacts are preferably formed of a material such as a fluororesin, or polyacetal which has a small friction coefficient. Also the linear portions L1 to L4 are also preferably configured in the same manner. The faces to which the coil spring 510 slidingly contacts and which are formed by a material of a small friction coefficient may be realized by coating the contacting faces with a material of a small friction coefficient, or by forming the guiding members of a material of a small friction coefficient. In the case where the contacting faces are formed of guiding members of such material, the guiding members can be previously formed and thereafter assembled into the device, thereby simplifying the assembly process of the device. In the case where the coating process is done, it is not required to prepare the guiding members as separate parts. In this manner, device 500 can be miniaturized.

In this first embodiment, the long edge portions L1 and L2 originally exhibit a relatively small friction resistance as described above, and the long edge portion L1 opens downward and the long edge portion L2 opens upward as described later so that the friction resistance due to these portions is further reduced. As described in detail later, the long edge portions L1 and L2 of the guide portion are configured by the lower case 220 itself, and the corners C1, C2, C3 and C4 and the short edge portions L3 and L4 are configured by two guiding members 540 and 550 (FIG. 5) made of a material having a friction coefficient smaller than that of a material (e.g., an ASS resin) constituting the lower case 220.

As shown in FIG. 3, one of the long edge portions L1 and L2, i.e., the long edge portion L1 is in the developing device 300, and the other long edge portion L2 is in the cleaning device 400. In the one long edge portion L1, an upward wall 221 of the lower case 220 constitutes the guide portion, and, in the other long edge portion L2, a groove 222 formed on the upper face of the lower case 220 constitutes the guide portion. In the long edge portion L1 in the developing device 300, moreover, only the outside of the coil spring 510 is guided by the upward wall 221. As a result, an open portion 531 is formed so that the lower portion of the coil spring 510 is exposed to the developing device 300.

FIG. 8(a) is a front plan view of the guiding member 540, and FIG. 8(b) is a side elevation view thereof. The guiding member 540 has a substantially U-like shape, or a trough-like configuration, having a groove (hereinafter, referred to as "U-groove") 541 which has a U-like cross-sectional shape and guides the coil spring 510. The guiding member 540 is made of a material, for example, a fluororesin or polyacetal, which has a small friction coefficient. The center line O of the guiding member 540 consists of a series of curves each having one of three curvatures RS, R2 and R3, so that the resistance exerted on the coil spring 510 is further reduced. In order to smoothly connect the guiding member 540 to the long edge portions L1 and L2, the both ends of the guiding member 540 are formed as taper portions 542.

The guiding member 550 is made of a similar material as that of the guiding member 540. As shown in FIG. 9, the guiding member 550 has a substantially U-like shape, or a trough-like configuration, having a groove 551 for guiding the coil spring 510. The center line O of the guiding member 550 consists of a series of curves each having one of five curvatures RO, RS, R2, R2', and R3. The curvatures of the guiding members 540 and 550 have dimensional relationships of RO>RS>R2>R2'>R3. In order to smoothly connect the guiding member 550 to the long edge portions L1 and L2, the both ends of the guiding member 550 are formed as taper portions 552.

A recess 553 for housing the driving gear 520, which rotates in the direction of arrow G, is formed at a corner of the guiding member 550. A tubular portion 554 through which a driving shaft 521 (see FIG. 5) for rotating the driving gear 520 is to be passed is formed under the center area of the recess. Bearings 528a and 528b are provided for smooth rotation of driving gear 520.

As seen from the above-mentioned dimensional relationships, in the first embodiment, the curvature RO of the arc which is located in the upstream side in the driving direction (the direction of the arrow D) with respect to the driving gear 520 is larger than the curvature R2' of the arc which is located in the downstream side in the driving direction with respect to the driving gear 520.

On the upper face of the lower case 220, recesses (not shown) are formed to which the guiding members 540 and 550 are to be attached respectively and which have the same shape as these members. The guiding members 540 and 550 are fixed to the lower case 220 by attaching them to the recesses (see FIG. 5).

The portions above the thus configured guide portion 530 except the portion above the long edge portion L2 are closed by the lower face 232 of the upper case 230 (see FIG. 3). The lower face 232 of the upper case 230 is so structured that it does not contact with the upper end of the coil spring 510 or, even when it contacts with the upper end, the degree of the contact is small. Consequently, the lower face 232 does not function as a substantial resistance against the circulating coil spring 510.

The long edge portion L2 located in the cleaning device 400 (see FIG. 3) constitutes the toner recovery portion 560 for receiving toner which has been scraped off of photosensitive drum 201 by the cleaning blade 410 to recover this excess toner. Therefore, the portion above the long edge portion L2 is opened to the cleaning blade 410.

In order to prevent toner from escaping out of the device, as shown in FIG. 5, the lower and upper cases 220 and 230 are coupled with each other through packings 241 to 244 and 255.

Referring to FIG. 2, a toner tank 600 is detachably fixed to the upper case 230. The toner tank 600 comprises a case 610, a pair of agitators 620 and 630 which are rotatably disposed in the case 610, and a lid 640. Formed in the bottom of 611 of case 610, are a shaft hole 633 and a toner supply hole 634 which respectively oppose a shaft hole 233 and a toner supply hole 234 formed in the upper case 230 shown in FIG. 5. The upper end of the driving shaft 521 for the driving gear 520 passes through and protrudes from the shaft hole 233 of the upper case 230, and is connected to the lower end of the agitator 620 so as to rotate the agitator 620. A gear 631 fixed to the upper end of the other agitator 630 engages with a gear 621 fixed to the upper end of the agitator 620 through a transmission gear 641 which is attached to the lid 640. Consequently, the other agitator 630 rotates in the same direction as the agitator 620.

The agitators 620 and 630 are provided at their bottom with stirring-up vanes 622 and 632 which slidingly contact with the bottom face of the case. The toner stored in the case 610 is stirred upward by the stirring-up vanes 622 and 632 of the agitators 620 and 630. When toner in the image forming unit 200 is consumed, a quantity of toner which corresponds to the consumed quantity falls by gravity from the toner supply hole 634 into the image forming unit 200 through the toner supply hole 234 of the upper case 230, thereby supplying toner to the image forming unit 200. As seen from the position of the toner supply hole 234, toner is supplied to a position where the driving gear 520 is first engaged with the coil spring 510.

Next, the operation of the image forming unit 200, and mainly the operation of the toner transport mechanism 500 will be described.

As described above, toner is supplied by the toner transport mechanism 500 to the surface of the photosensitive drum 201, and a latent image on the surface of the photosensitive drum 201 is developed by the toner to form a toner image. After the toner image is transferred to the sheet P, residual toner adhering to the surface of the photosensitive drum 201 is removed by the cleaning blade 410 of the cleaning device 400, and is then recovered into the recovery portion 560 in the cleaning device 400.

The endless coil spring 510 is placed within the transport path so that it passes through cleaning device 400 and the developing device 300 and also circulates within the interior of the cleaning device 400 and the developing device 300. Since the coil spring 510 is driven by the driving gear 520 excess toner from the toner reservoir 301 of developing device 300 is transported by the coil spring 510 to the cleaning device 400. The residual toner recovered into the cleaning device 400 is transported to the developing device 300 while being stirred and mixed with the toner transported by the coil spring 510 from the toner reservoir 301.

The excess toner and the residual toner are transported while being held in the spaces formed by the element wire 512 of the coil spring 510 which slidingly contacts with the guide portion 53, unlike those in the prior art shown in FIG. 30 in which they are transported while being held in pores of the surface of the sponge. Therefore, the transportation of the toner is conducted more efficiently.

The guide portion 530 has the open portion 531 through which the lower portion of the coil spring 510 is exposed to the developing device 300. In the case where a large quantity of toner in the toner reservoir 301 has been consumed and its toner level is lowered, therefore, when toner transported by the coil spring 510 reaches the open portion, the toner is discharged by gravity toward the toner reservoir 301 of the developing device 300.

Consequently, according to the toner transport mechanism 500, the toner removing device which is required in the prior art device shown in FIG. 30 is not necessary, and the toner transportation can be conducted more efficiently by a simpler configuration.

Hereinafter, the manner of transporting toner will be described in more detail.

First, the circulating coil spring 510 passes below the toner supply hole 634 of the toner tank 600 and the toner supply hole 234 of the upper case 230 (hereinafter, the supply holes 634 and 234 are often referred to as merely "the supply holes"). The toner tank 600 is located above the circulation path of the coil spring 510. The toner in the toner tank 600 is stirred by the rotation of the agitators 620 and 630 which are driven through the driving shaft 521 which ensures uniformly mixed toner.

In the case where, when the coil spring 510 passes below the supply holes and the coil spring 510 is not filled with toner, toner in the toner tank 600 falls from the supply holes toward the coil spring 510. At this point, the coil spring 510 passes through a narrowed portion of the transport path which is narrowed by driving gear 520. Thus, although toner falls from the toner tank 600, the quantity of toner in the coil spring 510 is less than the total quantity of toner which could be transported. In addition, as shown in FIG. 2, the agitator 620 is provided with stirring-up vanes 622 which stir toner upward in the toner tank 600 as the agitator rotates. This configuration prevents toner from being pressed into the coil spring 510 in excess of the necessary quantity by pressure due to the weight of the toner in toner tank 600.

Consequently, the quantity of toner transported by the coil spring 510 is maintained at an adequate value.

In order to satisfactorily generate a force for stirring toner upward, it is preferable to set the tilt angle of the stirring-up vanes 622 and 632 relative to the plane perpendicular to the rotating shaft, to a predetermined value which is not greater than the angle at which toner is raised by the vanes without sliding off the vanes.

In the case where the coil spring 510 is filled with toner when it is circulated and reaches the supply holes, when the space for transporting toner of the coil spring 510 is narrowed by the driving gear 520, excess toner in the coil spring 510 is pushed out of the spring and enters the supply holes of the toner hopper which collects the excess toner. Since an upward-transporting force is applied by the stirring-up vanes 622 of the agitator 620 to toner in the toner tank 600 which is above the supply holes, toner which has been pushed by the driving gear 520 from the coil spring 510 into the supply holes enters toner tank 600 without clogging the supply holes and fills the space in the toner tank left vacant by the action of the stirring-up vanes. As a result of the operations described above, if the coil spring 510 is filled with toner when it reaches the supply holes, a part of the transported toner moves into the toner tank 600, so that the quantity of transported toner is maintained at an adequate value.

The coil spring 510 which has passed below the supply holes and transports a fixed quantity of toner leaves the driving gear 520 and moves to the developing device 300.

In the developing device 300, in the case where the quantity of toner stored in the toner reservoir 301 is not sufficient so that stored toner fails to contact with the coil spring 510, toner transported by the coil spring 510 falls into the toner reservoir 301. By contrast, in the case where the quantity of toner stored in the toner reservoir 301 is sufficient so that toner contacts with the coil spring 510, the coil spring 510 continues transporting the toner, and no additional toner falls into the toner reservoir 301. The toner-falling action in which the necessary quantity of toner falls from the coil spring 510, and the configuration wherein the coil spring 510 crosses the developing device 300 in the lengthwise direction of the image formation enables the quantity of toner stored in the toner reservoir 301 to remain constant, and as a result, allows the amount of toner which substantially contacts with the coil spring 510 to remain constant.

The coil spring 510 from which toner has fallen as required in the developing device 300 is guided by the guide portion 530 inside the casing, so that the moving direction of the coil spring 510 is changed and the coil spring 510 passes through the cleaning device 400.

The toner which has been scraped off by the cleaning blade 410 in the cleaning device 400 falls by gravity toward the coil spring 510. If the coil spring 510 is not in the state where it is completely filled with toner, the fallen toner is transported by the coil spring 510. Since, as described above, the quantity of toner transported by the coil spring 510 is controlled by narrowing the space for transporting toner by the action of driving gear 520, the coil spring will never be completely filled with toner. Since only a small quantity of untransferred toner remains on the photosensitive drum, the amount of toner which is removed by cleaning blade 410 and which falls into the cleaning device 400 is small. Accordingly, the coil spring 510 which has passed through the developing device 300 can transport toner which has fallen into the recovery portion 560 in the cleaning device 400.

The coil spring 510 which has passed through the cleaning device 400 continues to move along the toner transport path to again move below the supply holes of the toner tank 600, and repeats the above-mentioned operations while receiving a supply of toner as required from the toner tank 600, or returning toner in excess of the necessary quantity to the toner tank.

As described above, according to the first embodiment, the movement of the coil spring 510 along the toner transport path allows for the reuse of toner collected in the cleaning device 400, and as a result a reduction in the total amount of toner used in developing device 300 is realized.

Moreover, as described above, a toner transport mechanism which is free from aggregation of toner and clogging and excellent in reliability can be realized by using driving gear 520 or disposing other mechanisms to narrow the space for transporting toner in the toner transport path for the coil spring 510, by locating the toner hopper supply holes in the portion of the toner transport path where the space for transporting toner by coil spring 510 is narrowed by the driving gear 520, and by providing the agitator 620 for stirring toner in the toner tank 600 with the stirring-up vanes 622 which generate a toner-stirring force directed upward.

Since driving shaft 521 may be used to drive gear 520 which may be used to narrow the space in the toner transport path, and drive coil spring 510, as well as drive agitator 620 in the toner tank, a toner transporting mechanism which is reliable, small, and allows for power transmission to the toner transport mechanism and the agitators can be realized.

Since the quantity of toner supplied to the developing device 300 is automatic the driving operation of the driving shaft 521 for driving the coil spring 510 and the agitator 620 does not require a special control and can be conducted by a driving force transmitted from an electric motor for driving device used in the image forming process such as the photosensitive drum 201 and the developing roller 320. This allows an image forming apparatus having a power transmission mechanism which is very simple in structure and does not require additional controls, to be realized.

In this first embodiment, the coil spring 510 moves along the transport path from the developing device 300 to the cleaning device 400 and from the cleaning device 400 to the developing device 300 while transporting toner to and from each device, whereby the transported toner is effectively stirred and mixed during the transport process. Therefore, an agitator which is required to be disposed in the developing device in the prior art can be omitted, and the size of the developing device can be greatly reduced.

Experimentation has confirmed that when the toner transport mechanism is configured as an endless coil spring 510 as described above, toner is not transported unless a threshold amount of toner is contained within the spaces between the coils. This problem is dealt with by disposing toner tank 600 along the toner transport path on the upstream side of the developing device 300 in the direction of toner transport, as is described in the above-described first embodiment. If the amount of toner within endless coil spring 510 is below the threshold, no toner will be transferred along the toner transport path. However, before reaching developing device 300, the toner hopper will supply the necessary quantity of toner to endless coil spring 510. As a result, the necessary amount of toner will always be supplied to the developing device 300.

Figure 4:
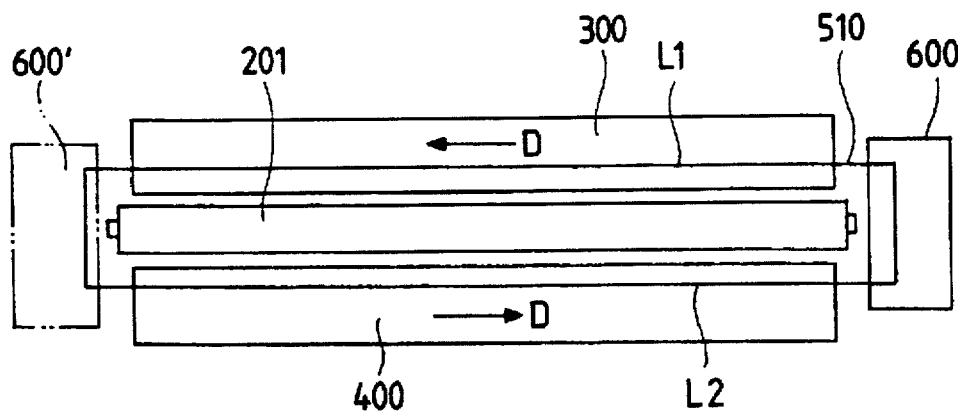
FIG. 4 is a schematic diagram showing the toner hopper disposed along the toner transport path of the first embodiment of the invention.

According to the invention, the toner tank may be disposed along the toner transport path in the upstream side of the cleaning device 400 in the toner transport direction as shown in FIG. 4 (phantom line 600'). In such an embodiment, in order to recover untransferred toner from the cleaning device 400, it is required to dispose a mechanism for supplying fresh toner intermittently or in a reduced quantity based on the amount of untransferred toner to be recovered from cleaning device 400. In contrast, according to the first embodiment, when the toner tank 600 is disposed along the toner transport path in the upstream side of the developing device 300 in the toner transport direction the advantage results that untransferred toner which has been recovered from cleaning device 400 in the manner described above, and fresh toner which has been supplied from the toner hopper are stirred and mixed with each other as the mixture is sent to the developing device 300 and no additional mechanism for supplying fresh toner intermittently or in a reduced quantity is required.

Figure 10A:
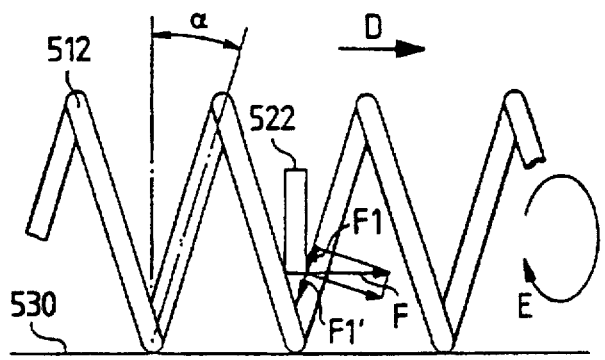
FIGS. 10(a), 10(b) and 10(c) are plan views of a portion of the coil spring and driving gear (FIGS. 10(a) and (b)) and of the driving gear alone (FIG. 10(c)), illustrating the operation of the embodiment.
Figure 10B:
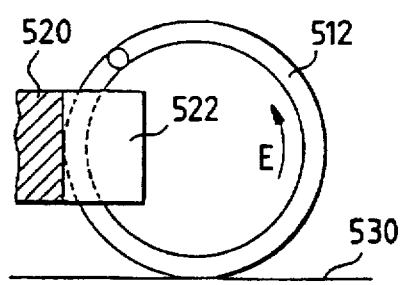

Since the coil spring 510 is in sliding contact with the guide portion 530 and is driven by the driving gear 520, the toner transport mechanism 500 has the following attributes:

(i) As shown in FIG. 10(a), the coil spring 510 has a pitch angle α. When a force F acting in the transport direction is applied from teeth 522 of driving gear 520 to the endless coil spring 510 in an engaging portion 501 (see FIG. 2), a component force F1 which is directed to a direction (an obliquely upward direction in FIG. 10(a)) different from the circulation direction (the direction indicated by arrow B), and a reaction force F1' opposing to this force are generated in the coil spring 510 in accordance with the pitch angle α. Since the driving gear 520 receives the driving force from the driving power source which is not shown, the reaction force F1' acts on the coil spring 510. As a result, the reaction force F1' causes the coil spring 510 to rotate about its axis (in the direction indicated by arrow E in FIGS. 10(a) and 10(b)).

Therefore, the coil spring 510 rotates about its axis while moving along the toner transport path. In the first embodiment, the coil spring 510 rotates five times for each complete circulation along the toner transport path.

(ii) When the coil spring 510 transports while rotating, the coil spring 510 is prevented from being locally arrested by the guide portion 530, thereby allowing the toner transportation to be smoothly conducted. Accordingly, the coil spring 510 can be circulated by a small driving force so that the size and the power consumption of the driving motor are reduced. This configuration allows the coil spring 510 to uniformly contact with every portion of the guide portion 530. Therefore, local abrasion is prevented from occurring and the endurability is improved.

(iii) When the coil spring 510 transports toner while rotating, transported toner is stirred. Accordingly, a combination of the stirring motion and the stretching motion of the coil spring 510 itself along the transport direction, or the minute stretching motion due to the elasticity of the spring prevents toner from being blocked, and, when there are toner blocks, breaks these toner blocks. Moreover, residual toner which has been recovered in the recovery portion 560 of the cleaning device 400, and fresh toner which has newly been supplied from the toner tank 600 are satisfactorily stirred and mixed together. Also excess toner and residual toner produced in the developing device 300 are satisfactorily stirred and mixed with each other.

(iv) When the coil spring 510 transports while rotating, the transport operation can be conducted more smoothly. Therefore, it is sufficient to configure the path by only the guide portion 530. As a result, pulleys 27b, 27c and 27d which are required in the prior art example shown in FIG. 30 are not necessary in the current invention.

Consequently, the size of the device can be further reduced.

Figure 10C:
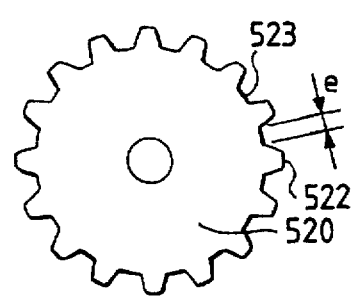

When the coil spring 510 is driven by engaging the driving gear 520 with the coil spring 510, the element wire 512 of the coil spring 510 enters the spaces 523 between teeth 522 (see FIG. 10(c)) of the driving gear 520. Toner may be pressed into the spaces 523 by the element wire 512. There is a possibility that pressed toner will gradually collect and fill up the spaces 523 in the driving gear 520 so that the driving of the coil spring 510 becomes hampered. In order to deal with this problem, the width e of the spaces 523 is greater than the diameter of the element wire 512. As a result, the element wire 512 cannot cause a buildup of toner in the spaces 523.

In the toner transport mechanism, the guide portion 530 has a configuration in which the coil spring 510 which has a substantially circular ring shape when not within guide portion 530, is reformed into a substantially rectangular shape in a plan view in which four corners C1, C2, C3 and C4 have a substantially quadrant shape and the both ends of the quadrants are connected by arcuate portions L1 to L4 which swell outside a circumscribing line of the quadrants. Therefore, the following benefits are realized:

As shown in FIGS. 2, 3 and 4, the developing device 300 and the cleaning device 400 have a substantially rectangular shape in a plan view, and are disposed in parallel with the photosensitive drum 201. In the first embodiment, the coil spring 510 is reformed into a substantially rectangular shape in a plan view. As a result, the coil spring 510 is guided in accordance with the layout of the developing device 300 and the cleaning device 400. Therefore, not only the image forming unit but also the entire printer can be miniaturized.

As noted, the coil spring 510 has a substantially circular ring shape when not within guide portion 530. When reformed into a substantially rectangular shape, the coil spring 510 in the substantially linear portions of guide portion 530 swells out as a result of its restoring force so that it is guided while in sliding contact with the guide portion 530. As a result resistance due to a friction force is generated in the sliding portions.

In order to deal with this problem, the first embodiment contains edge portions L1, L2, L3 and L4 of the guide portion 530 which are formed as arcuate portions swelling outwards. Therefore, the friction resistance generated in the sliding portions can be greatly reduced so that a smooth movement of the coil spring 510 is obtained. Accordingly, the size and the power consumption of the driving motor can be reduced.

when the coil spring 510 is reformed into a substantially rectangular shape in accordance with the layout of the developing device 300 and the cleaning device 400, the restoring force of the coil spring 510 exerted in the short edge portions L3 and L4 is greater than that exerted in the long edge portions L1 and L2. Consequently, the friction resistance generated in the short edge portions L3 and L4 is greater than that generated in the long edge portions L1 and L2.

In order to deal with this concern, the toner transport mechanism of the first embodiment, is formed so that the curvature RL of the arcs constituting the long edge portions L1 and L2 is greater than the curvature RS of the arcs constituting the short edge portions L3 and L4. Thus, the increase in the friction resistance generated in the short edge portions L3 and L4 is suppressed so that a smoother movement of the coil spring 510 is realized.

When the driving gear 520 is disposed in the corner C4 of the toner transport path, the coil spring 510 is pulled on the upstream side on the driving direction with respect to the driving gear 520, and compressed on the downstream side. Consequently, the friction resistance due to the restoring force of the coil spring 510 is decreased on the upstream side of the driving gear 520, and increased on the downstream side.

The first embodiment deals with this problem by having a toner transport mechanism, in which the curvature RO of the arc which is located on the upstream side of the guide portion in the driving direction with respect to the driving gear 520 is larger than the curvature R2' of the arc which is located on the downstream side of the guide portion. Therefore, the increase of the friction resistance on the downstream side as described above is suppressed so that a smoother movement of the coil spring 510 is obtained.

Figure 11A:
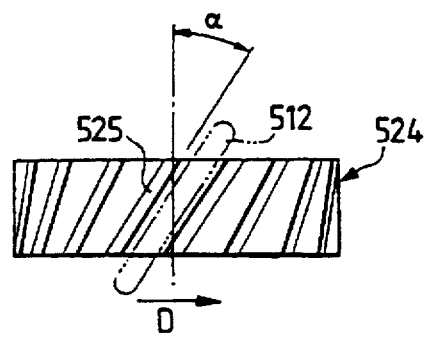
FIG. 11(a) is a view illustrating a second embodiment of the driving gear of the invention.

Reference is made to FIG. 11(a) of the drawings which depicts a second embodiment of the present invention. In this second embodiment, the driving gear is constructed as a helical gear 524 having helical teeth 525 which are inclined at the same angle as the element wire 512 of the coil spring 510 in the engaging portion 501 where the driving gear 520 first engages with the coil spring 510. According to this configuration, in addition to the benefits of the first embodiment, the following benefit is achieved:

As described in the first embodiment, the driving gear 520 may be constructed as a spur gear. When the coil spring 510 is driven by a spur gear, however, the element wire 512 which is inclined to the transport direction is pressed by the edge of a tooth flank which is perpendicular to the transport direction. Consequently, the element wire 512 is liable to be subjected to a concentrated load at the edge of the tooth and the element wire 512 may be deformed.

In the second embodiment, since the driving gear is constructed as the helical gear 524, the element wire 512 is pressed by the whole of a tooth flank of the helical gear 524. Consequently, the transmission loss of the driving force is reduced, and the concentration of force acting on the element wire 512 is moderated so that the element wire 512 is prevented from being deformed. In accordance with this embodiment, the rotation force on the coil spring 510 due to a torsion moment is reduced. Thus, the coil spring 510 rotates only two times for each complete circulation along the toner transport path.

Figure 11B:
FIG. 11(b) is a cross-sectional view showing a further modification of a driving gear.
Figure 12A:
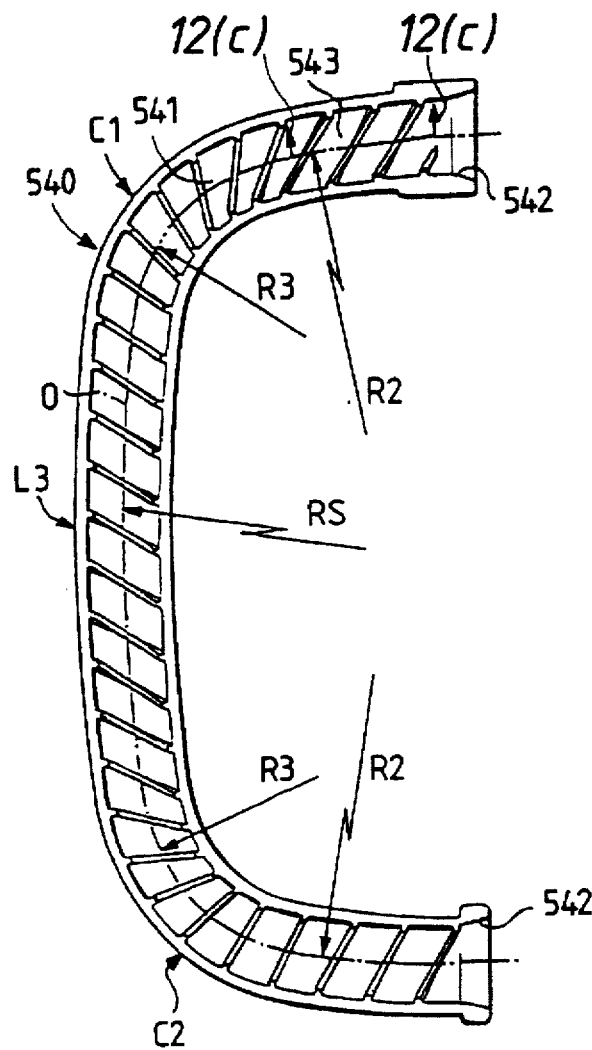
FIG. 12(a) is a front plan view showing a modification of one of the guiding members.
Figure 12B:
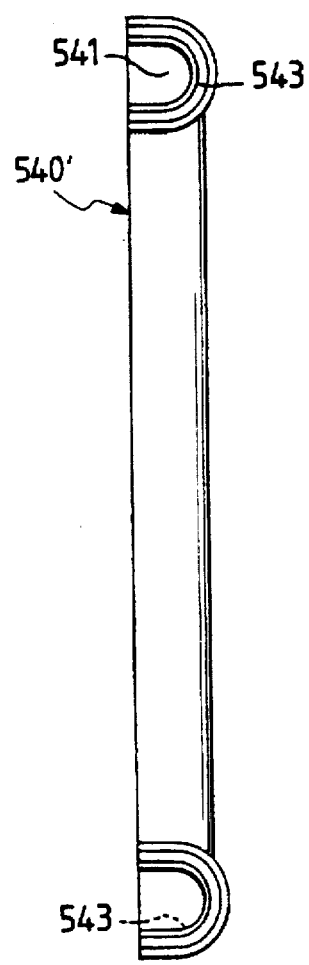
FIG. 12(b) is a side elevation view thereof and FIG. 12(c) is a cross-sectional view taken along lines 12(c)—12(c) of FIG. 12(a)
Figure 12C:
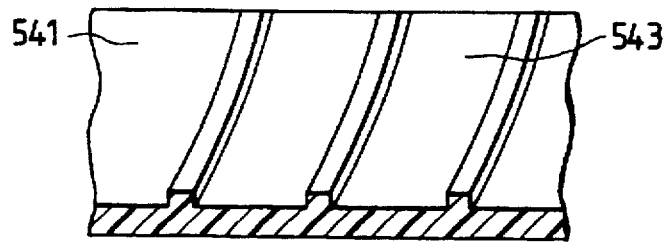

Whether the driving gear is constructed as a spur gear as in the first embodiment or as a helical gear as in the second embodiment, when the uneven surface 526 of the spaces 523 between teeth of the gear (See FIG. 10(c)) is formed so as to have a shape in which the center portion of the spaces 523 (See FIG. 10(c)) is deepest as shown in FIG. 11(b), vertical movement (particularly, upward movement) of the coil spring 510 is restricted so that a stable driving state is obtained.

Reference is made to FIGS. 12(a)–12(c) and 13(a)–(b) of the drawings, which depict a third embodiment of the present invention. In this third embodiment, like parts are given like reference numbers.

As is shown in FIGS. 12 and 13, grooves 543 and 555 which cross the winding direction of the coil spring 510 are formed on the faces of the U-grooves 541 and 551 of the guiding members 540' and 550' which slidingly contact with the coil spring 510. Although only three grooves 555 are shown in FIG. 13(a), the grooves 555 are formed so as to be distributed over the entire length of the U-groove 551, except that in the recess 553, the grooves 555 are formed so as not to interfere with the driving gear 520.

Also in the linear portions of the guide portion 530, grooves may be formed in a similar manner. Particularly, it is preferable to form grooves similar to the grooves 543 also in the trough-like groove 222 (see FIG. 3) of the recovery portion 560. When grooves are formed also in the trough-like groove 222, a smoother circulation of the coil spring 510 can be obtained.

In this configuration, since the grooves 543 and 555 crossing the winding direction of the coil spring 510 are formed on the faces of the guide portion 530 which slidingly contact with the coil spring 510, the contacting area between the guide portion 530 and the coil spring 510 is reduced.

Therefore, the resistance due to the friction between the guide portion 530 and the coil spring 510 is reduced, thereby enabling the coil spring 510 to move and rotate in a smoother manner. Particularly, since the grooves 543 and 555 are formed at locations where, if they are not formed, the friction resistance is increased, the friction resistance can be reduced effectively.

These grooves 543 and 555 solve another problem with the previous embodiments. If the guide portion 530 is configured so as to have a quadrangular section shape, toner existing in corners of the bottom of the guide portion 530 may fail to receive the transportation force from the coil spring 510. As a result, wasted toner may build up in the corners of guide portion 530.

If the guide portion 530 is configured so as to have an 0-like section shape, the quantity of dead toner can be reduced to a very small level. However, this produces an additional problem in that the contact area between the guide portion 530 and the coil spring 510 is increased.

In order to remedy this situation, the guide portion 530 of this third embodiment has a trough-like portion having a U-like section shape, and the grooves 543 and 555 are formed in the trough-like portion. As a result, although the quantity of dead toner is somewhat increased by the formation of the grooves, the contact area between the guide portion 530 and the coil spring 510 is reduced to a very small level, whereby a satisfactory toner transporting state can be obtained on the whole.

Reference is made to FIGS. 14–23 of the drawings which depict a fourth embodiment of the present invention. In this fourth embodiment, like parts are given like reference numerals.

Figure 14:
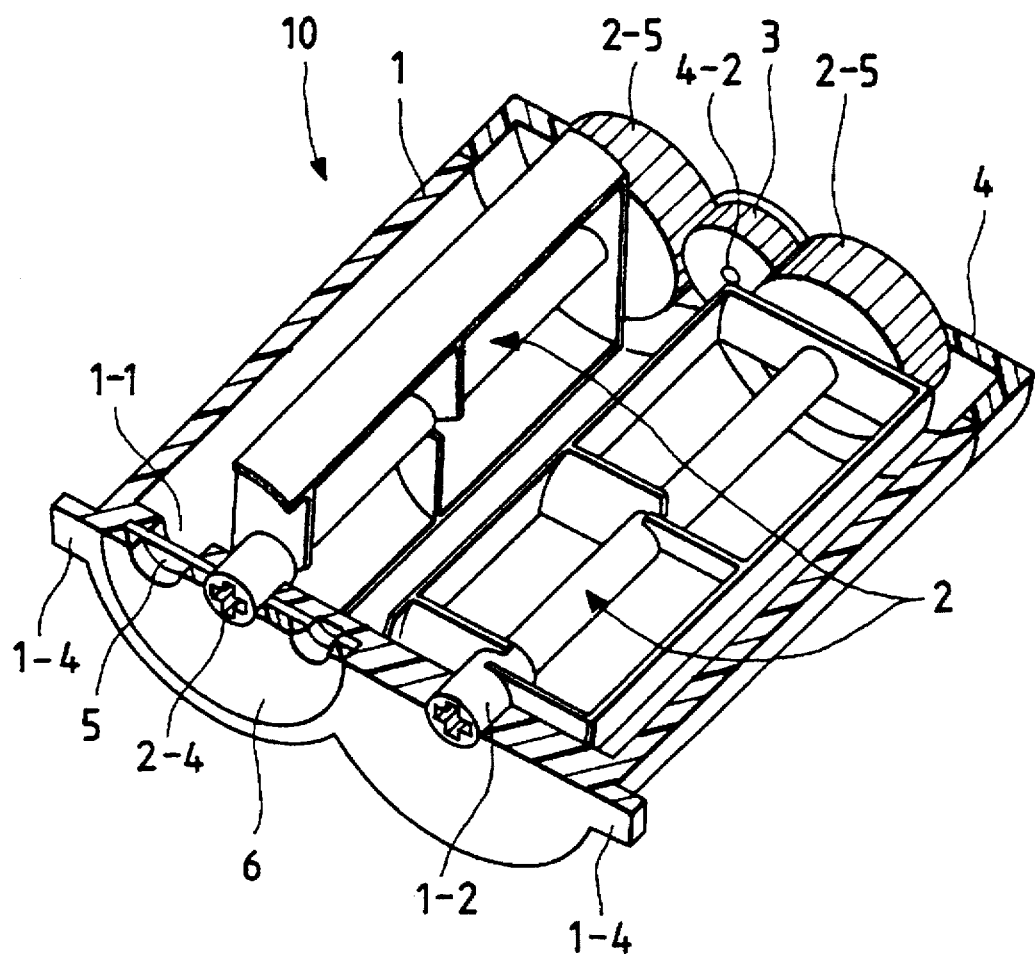
FIG. 14 is a perspective cross-sectional view showing an example of a further embodiment of toner tank in accordance with the invention.

FIG. 14 is a cross-sectional perspective view showing the main portion of a toner tank indicated generally as 10.

Figure 20:
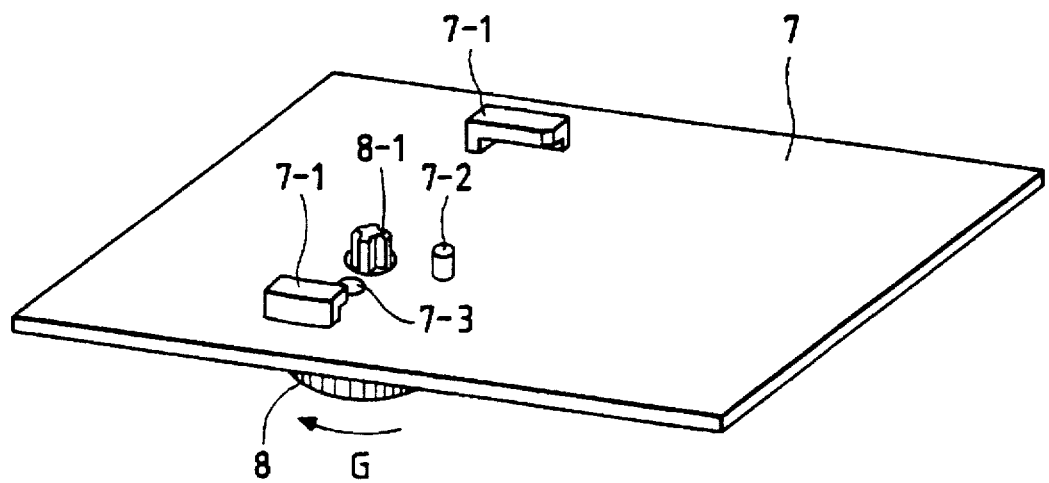
FIG. 20 is a perspective view of a toner tank support of an image forming apparatus to which the toner tank is attached.

The toner tank 10 comprises a toner container 1 for storing toner, two agitators 2 for stirring toner, an intermediate gear 3 engaging with agitator gears 2–5 which are respectively integrated with the agitators 2, a lid 4 for hermetically sealing the toner container 1, a shutter 5 for closing a toner supply port 1-1 so that toner is prevented from escaping out through the toner supply port 1-1 when the toner tank 10 is not attached to a toner tank support 7 of an image forming apparatus, and a shutter presser 6 for pressing the shutter 5. The toner tank 10 is attached to the toner tank support 7 of the image forming apparatus which is shown in FIG. 20, and supplies toner to the image forming apparatus. When the toner tank 10 is attached to the image forming apparatus of the first embodiment, the toner tank support 7 is formed on the upper case 230 used in the first embodiment.

Figure 15A:
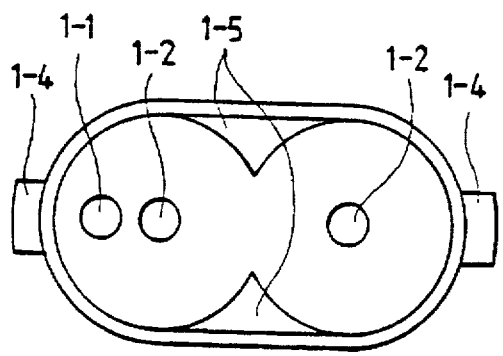
FIG. 15(a) is a top view showing a toner container.
Figure 15C:
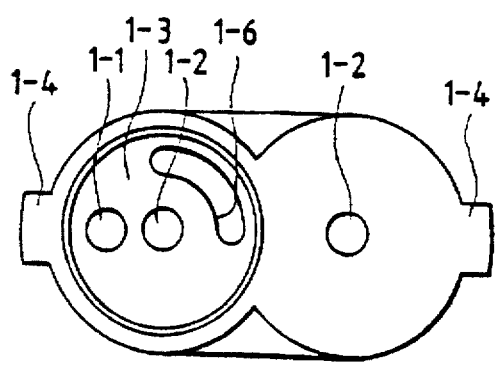
FIG. 15(c) is a bottom view thereof.
Figure 15B:
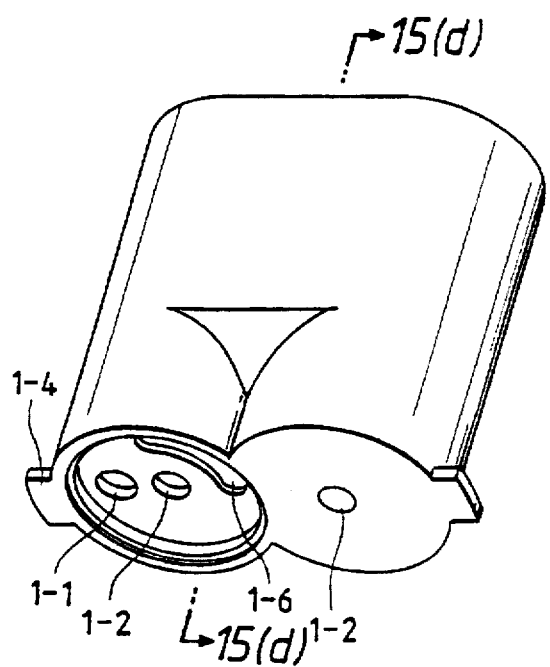
FIG. 15(b) is a front view thereof.

As seen in FIG. 15(a), the upper portion of the inner wall of the toner container 1 has a track-like shape which consists of two arcs and straight lines connecting these arcs. The portion of the inner wall of the toner container 1 in the vicinity of the bottom of toner container 1 has a substantially figure 8-like section shape.

Figure 15D:
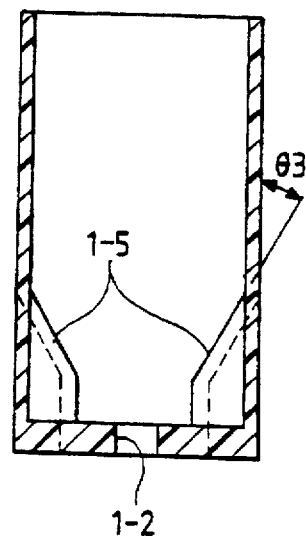
FIG. 15(d) is a cross-sectional view taken along lines 15(d)—15(d) of FIG. 15(b)

The inner wall extending from the upper portion to the lower portion of the toner container 1 constitutes an inclined face 1-5 which is inclined at angle θ3 shown in FIG. 15(d). The angle θ3 is required for permitting toner to slide down to the bottom of the toner container, and is set to be 30 deg. in the embodiment.

Figure 16A:
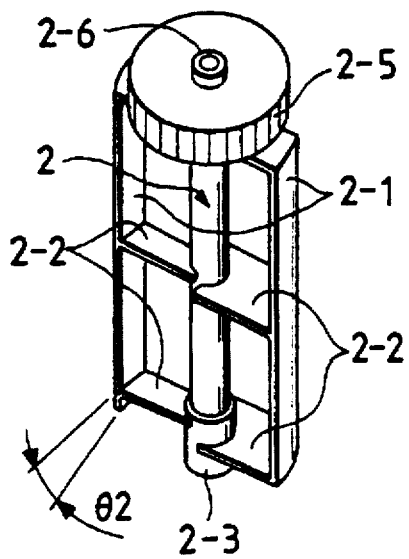
FIG. 16(a) is a perspective view showing an agitator of the toner tank.

The toner container 1 is integrally provided with the toner supply port 1-1 through which toner is supplied to a toner receive port 7-3 formed in the toner tank support 7 (see FIG. 20), holes 1-2 for rotatably supporting the agitators 2 shown in FIG. 16(a), a recess 1-3 which is formed on the outer face of the bottom and in which the shutter 5 (see FIG. 18) is to be disposed, an arcuate groove 1-6 in the surface of recess 1-3 for receipt of the end of shutter positioning shaft 7-2 formed in the toner tank support as shown in FIG. 20, and projections 1-4 for engaging the toner container 1 with the toner tank support 7.

Figure 16B:
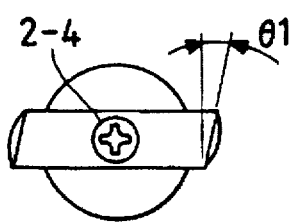
FIG. 16(b) is a bottom view.

As shown in FIG. 16(a), each of the agitators 2 is integrally provided with two vertical vanes 2-1 which extend vertically in the outer periphery, four stirring-up vanes 2-2 which extend horizontally, an agitator shaft 2-3, a cross recess 2-4 (see FIG. 16(b)) formed on the lower portion of the agitator shaft 2-3, an agitator gear 2-5 which is disposed in the upper side of the agitator 2, and a hole 2-6 formed on the upper side of the agitator gear 2-5.

Figure 17:
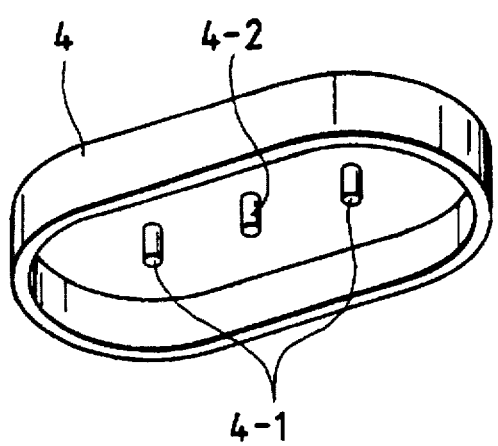
FIG. 17 is a perspective view of a lid of the toner tank as seen from below.

The lower portion of the agitator shaft 2-3 is rotatably supported by the hole 1-2 formed in the bottom of the toner container 1, and the hole 2-6 formed on the upper side of the agitator gear is rotatably supported by a shaft 4-1 formed on the lid 4 shown in FIG. 17. The agitator gear 2-5 engages with the intermediate gear 3 shown in FIG. 14. The two agitators 2 are assembled so that their rotation phases are displaced from each other by 90 deg.

Figure 16C:
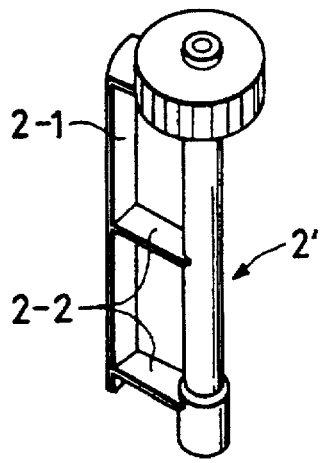
FIG. 16(c) is a perspective view showing a modification of the agitator.

As shown in FIG. 16(b), the vertical vanes 2-1 are inclined at angle θ1 to the tangential direction. As shown in FIG. 16(a), the rear portions of the stirring-up vanes 2-2 are inclined upward at angle θ2 to the rotation direction, and the two lower vanes 2-2 contact with the inner face of the bottom of the toner container 1. In this fourth embodiment, θ1 is set to be 10 deg. and θ2 to be 24 deg. Alternatively, as shown in FIG. 16(c), each agitator 2' may consist of one vertical vane 2-1, and two stirring-up vanes 2-2.

As shown in FIG. 14, the intermediate gear 3 is rotatably supported by an intermediate gear shaft 4-2 of the lid 4 (see FIG. 17) and engages with the agitator gears 2-5 so that the two agitators 2 rotate in the same direction.

The lid 4 is welded to the upper portion of the toner container 1 so that toner contained in the toner container 1 is prevented from escaping out of the container. The shafts 4-1 for supporting the agitators 2 and the intermediate gear shaft 4-2 for supporting the intermediate gear 3 are formed integral with the lower face of lid 4.

Figure 18:
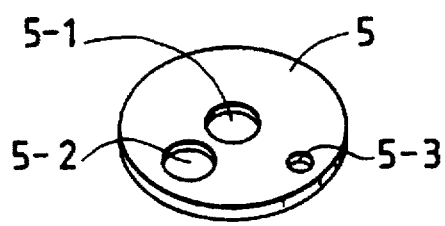
FIG. 18 is a perspective view of a shutter of the toner tank.

As shown in FIG. 18, the shutter 5 comprises a hole 5-1 through which one of the agitator shafts 2-3 passes, a hole 5-2 for supplying toner to the toner receive port 7-3 formed in the toner tank support 7 shown in FIG. 20, and a positioning hole 5-3 for setting the rotation position of the shutter 5. The shutter 5 is closely but rotatably disposed in the recess 1-3 formed on the outer face of the bottom of the toner container 1.

When the toner tank 10 is not attached to the toner tank support 7, the shutter 5 closes the toner supply port 1-1 so that toner is prevented from escaping out through the toner supply port 1-1.

Figure 19:
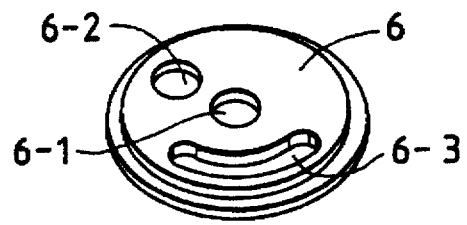
FIG. 19 is a perspective view of a shutter presser of the toner tank.

As shown in FIG. 19, the shutter presser 6 comprises a hole 6-1 through which one of the agitator shafts 2-3 passes, a through hole 6-2 for supplying toner to the toner receive port 7-3 formed in the toner tank support 7 (see FIG. 20), and an arcuate relief hole 6-3 through which a shutter-positioning shaft 7-2 formed on the toner tank support 7 passes. The shutter presser 6 is welded to the outer face of the bottom of the toner container 1 so that the shutter 5 is sandwiched between the presser and the outer face under the state where the position of through hole 6-2 coincides with that of the toner supply port 1-1 formed in the bottom of the toner container 1.

Although two agitators 2 are used in the embodiment, one or three or more agitators may be used.

Next, the configuration of the toner tank support 7 will be described. As shown in FIG. 20, the toner tank support 7 is integrally provided with two hooks 7-1 for engaging toner tank 10, a shutter-positioning shaft 7-2 for positioning the shutter 5, and the toner receive port 7-3 for supplying toner to the image forming apparatus. An agitator-driving gear 8 for driving the agitators 2 is rotatably supported on the toner tank support 7 and may also be the driving gear for the coil spring described above. The agitator-driving gear 8 is rotated by power transmitted from the image forming apparatus. A cross projection 8-1 is formed in the upper portion of the shaft of the agitator-driving gear 8.

Next, the operation of attaching the toner tank 10 to the toner tank support 7 will be described.

Figure 21:
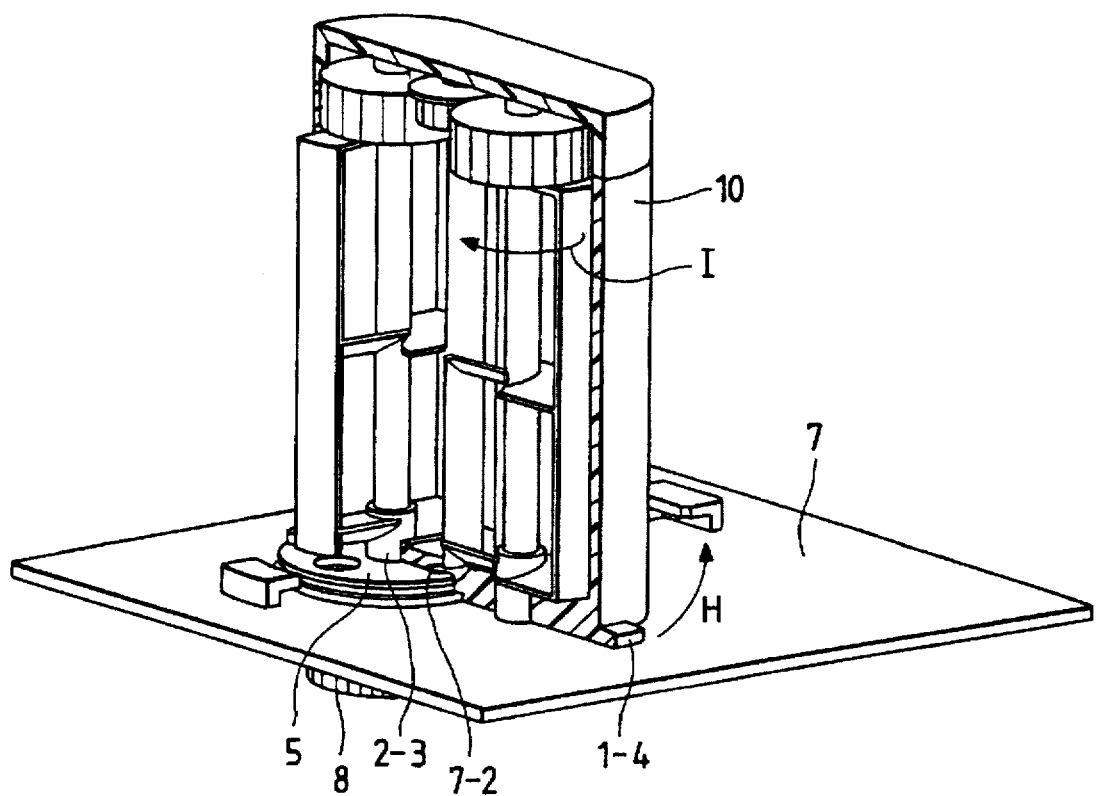
FIG. 21 is a perspective cross-sectional view illustrating the operation of attaching the toner tank to the toner tank support.

First, the toner tank 10 is placed at a position shown in FIG. 21 on the toner tank support 7. At this time, the cross recess 2-4 (see FIG. 14) formed on the lower portion of the agitator shaft 2-3 engages with the cross projection 8-1 (see FIG. 20) formed in the upper end of the shaft of the agitator-driving gear 8. The shutter-positioning shaft 7-2 of the toner tank support 7 is fitted into the positioning hole 5-3 (see FIG. 18) of the shutter 5, passing through relief hole 6-3 and entering arcuate groove 1-6.

Figure 22:
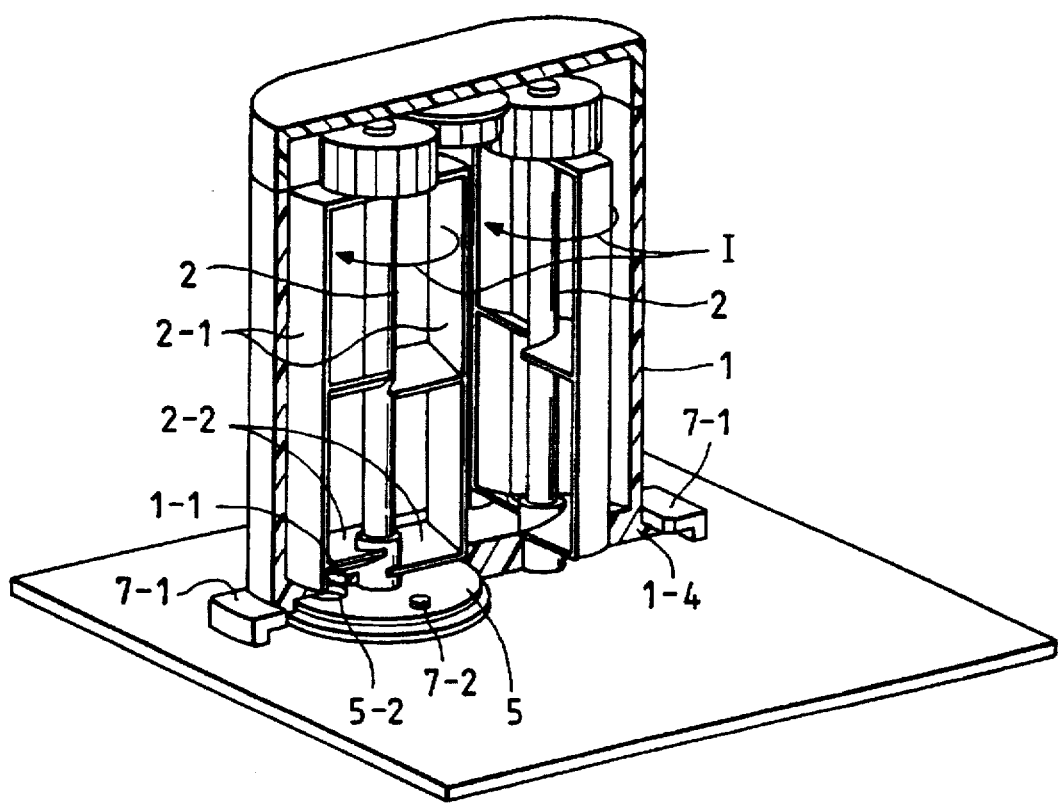
FIG. 22 is a perspective cross-sectional view showing the state in which the toner tank is attached to the toner tank support.

Then the toner tank 10 is rotated by 90 degrees about the agitator shaft 2-3 in the direction indicated by arrow H shown in FIG. 21, so that the projections 1-4 disposed on the toner container 1 engage with the hooks 7-1 disposed on the toner tank support 7, whereby the toner tank 10 is attached to the toner tank support 7 as shown in FIG. 22. Since the shutter-positioning shaft 7-2 of the toner tank support 7 is fitted into the positioning hole 5-3 of the shutter 5, the shutter 5 does not rotate when the toner tank 10 is rotated by 90 deg. in the direction of the arrow H shown in FIG. 21, while relief hole 6-3 and arcuate groove 1-6 permit the rotation relative to the fixed shutter-positioning shaft 7-2. The rotation of toner tank 10 causes the toner supply port 1-1 formed in the bottom of the toner container 1, the hole 5-2 formed in the shutter 5, the through hole 6-2 formed in the shutter presser 6, and the toner receive port 7-3 formed in the toner tank support 7, to be positionally coincide with each other, so that toner can be supplied to the image forming apparatus. When the toner tank 10 is rotated, the one agitator 2 coupled with the agitator-driving gear 8 does not rotate (but conducts a relative rotation with respect to the toner container 1). In accordance with the principle of an epycyclic gear, therefore, the other agitator 2 rotates in the direction indicated by arrow I shown in FIG. 21 to stir the toner.

When the agitator-driving gear 8 is rotated in the direction indicated by arrow C shown in FIG. 20 by the power transmitted from the image forming apparatus in the state where the toner container 10 is attached to the toner tank support 7 as shown in FIG. 22, the two agitators 2 rotate in the direction of an arrows I shown in FIG. 22. At this time, since the vertical vanes 2-1 of each agitator 2 are inclined at angle θ1 shown in FIG. 16(b), the vertical vanes 2-1 perform the function of scraping up toner toward the rotation center of the agitator 2. Since the stirring-up vanes 2-2 are inclined at angle θ2 shown in FIG. 16(a), the stirring-up vanes 2-2 stir toner in such a manner that toner is scooped up, and, when the quantity of toner is in excess, prevents toner from being oversupplied by gravity through the toner supply port 1-1 to the image forming apparatus. When the quantity of toner is in short, the stirring-up vanes 2-2 transport toner to the toner supply port 1-1.

Figure 23A:
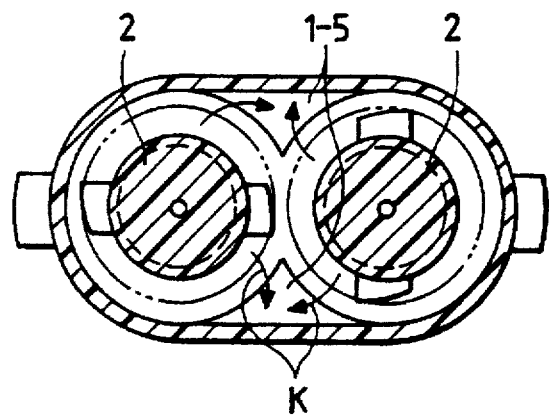
FIG. 23(a) is a cross-sectional view taken along lines 23(a)—23(a) of FIG. 23(c) showing a relationship between the toner container of the toner tank and rotation loci of agitators, and the flowing state of toner.
Figure 23B:
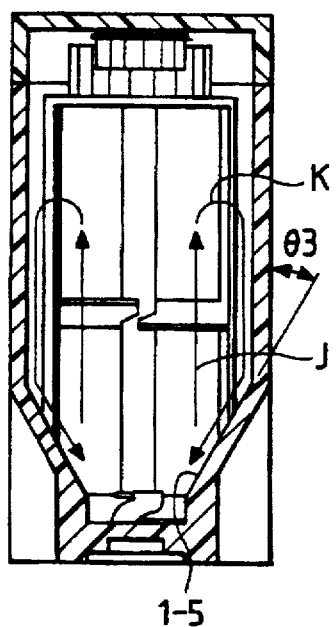
FIG. 23(b) is a cross-sectional view taken along lines 23(b)—23(b) of FIG. 23(c)
Figure 23C:
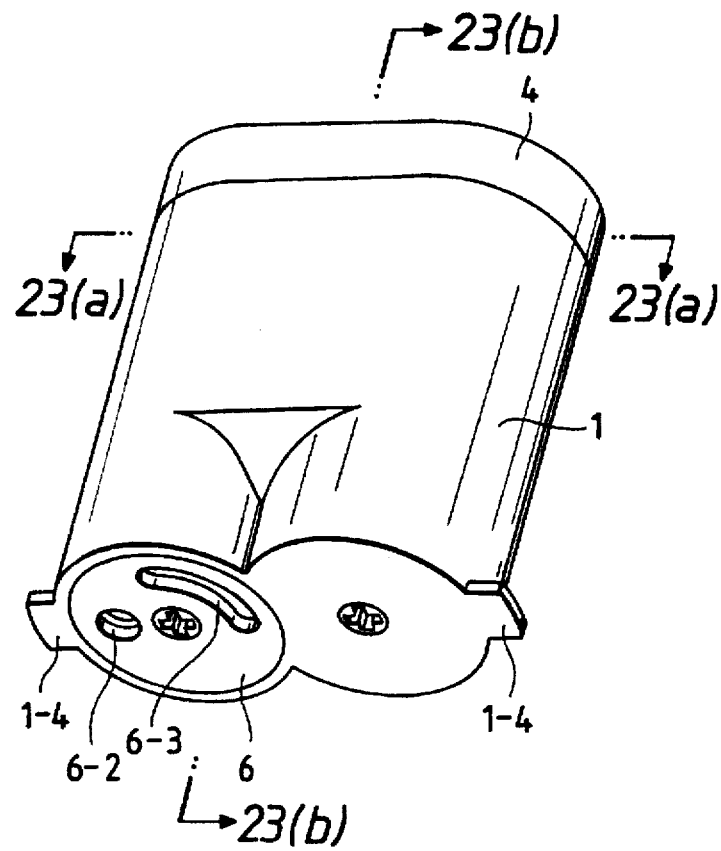
FIG. 23(c) is a front view of the toner tank.

As shown in FIG. 23, the upper portion of the inner wall of the toner container 1 has a track-like shape which consists of two arcs and straight lines connecting these arcs, the portion of the inner wall of the toner container 1 which is in the vicinity of the bottom has a substantially 8-like section shape that is almost coincident with the outer periphery of the rotation loci of the agitators 2, and the inclined face 1-5 inclined at angle θ3 is formed in the lower portion of the toner container 1. Therefore, toner flows in the direction indicated by arrows J shown in FIG. 23(b) (the direction from the bottom to the top) while being stirred by the rotation of the agitators 2. Then toner then falls in the direction indicated by arrows K shown in FIGS. 23(a) and 23(b) or toward the inclined face 1-5, and thereafter flows into the area within the rotation loci of the agitators 2 while sliding down the inclined face 1-5, so that toner is uniformly stirred. Accordingly, all blocks of toner are broken so that the fluidity of the toner is improved, thereby obtaining an excellent printing quality free from printing blur.

When toner contained in the toner container 1 is consumed and the residual quantity becomes small, toner which is outside the rotation loci of the agitators 2 or on the inclined face 1-5 slides down the inclined face 1-5 because the inclined face 1-5 is inclined at angle θ3, and flows in the area within the rotation loci of the agitators 2. Then, toner is transported toward the toner supply port 1-1 by the rotation of the stirring-up vanes 2-2. Consequently, the quantity of residual toner is greatly reduced so that toner can be used without waste.

As described above, in the toner tank 10, the lower portion of the inner wall of the toner container 1 has a substantially 8-like section shape that is almost coincident with the outer periphery of the rotation loci of the agitators 2, and the inclined face 1-5 inclined at angle θ3 is formed in the lower portion of the toner container 1. Therefore, the space between the inner wall and the rotation loci of the agitators 2 is narrowed so that toner is uniformly stirred to eliminate blocks of toner, thereby obtaining an excellent printing quality free from printing blur. Moreover, the toner tank yields additional benefits such as when the quantity of toner remaining in the toner container 1 becomes small, the quantity of residual toner can be greatly reduced so that toner can be used without waste.

Reference is made to FIGS. 24(a) and (b) and 25 of the drawings which depict a fifth embodiment of the present invention. In this fifth embodiment, like parts are given like reference numbers. The embodiment uses a toner transport mechanism and a toner tank which are different from those used in the first embodiment. In FIGS. 24(a) and 24(b), the image forming apparatus shown generally at 700 includes a developing device 710, a cleaning device 720, a coil spring 731 traveling in the direction indicated by arrow 731a, a driving gear 732, a driving shaft 733, an arcuate toner supply hole 734, a toner tank 735, a lid 736, and an agitator 737.

In this fifth embodiment, case 701 of image forming apparatus 700 and the toner tank 735 are integrally formed. When the lid 736 is removed, toner can be supplied from the outside into the toner tank 735.

The coil spring 731 is driven by the large driving gear 732 so as to circulate in a track-like shape (an oval shape). The arcuate toner supply hole 734 is configured as a quadrant formed in the region where the coil spring 731 engages with the large driving gear 732.

Figure 25:
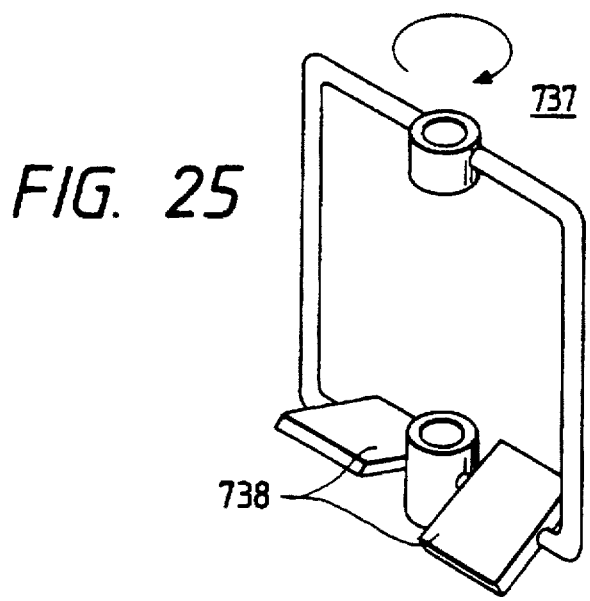
FIG. 25 is a perspective view of the agitator shown in FIG. 24(b)

The agitator 737 is provided at its lower end with stirring-up vanes 738 (see FIG. 25) which function in the same manner as the stirring-up vanes 622 of the first embodiment. The agitator 737 is driven through the driving shaft 733 for the driving gear 732.

Figure 26A:
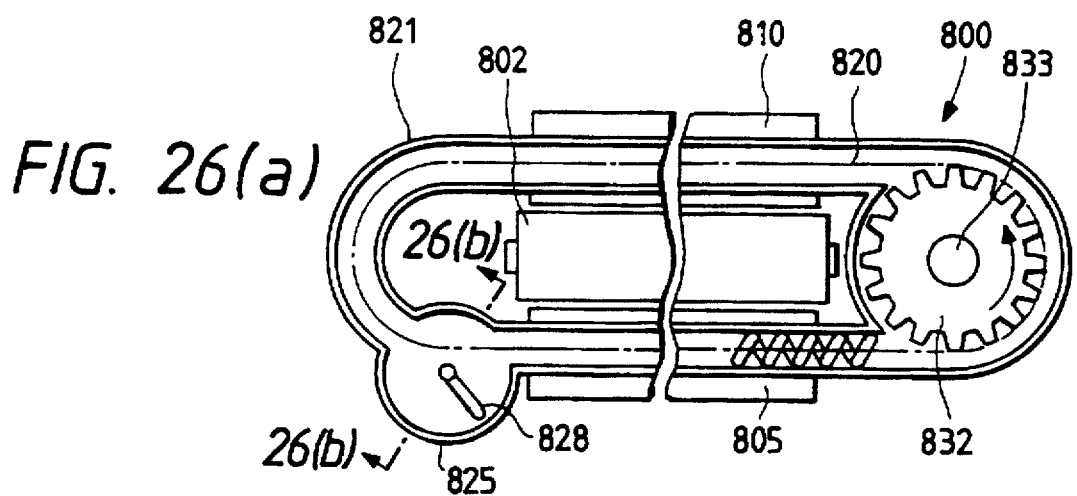
FIG. 26(a) is a cross-sectional view taken along the path of the toner transport mechanism showing a toner transport mechanism, and a toner tank of this embodiment of the invention, FIG. 26(a)
Figure 26B:
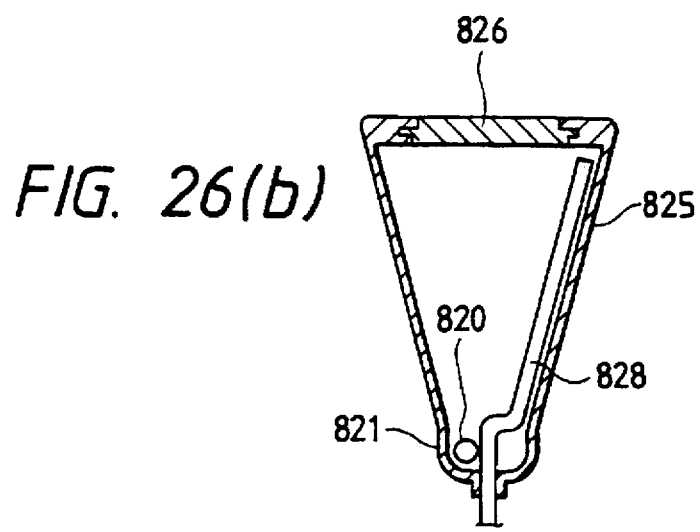
FIG. 26(b) is a cross-sectional end view taken along lines 26(b)—26(b) of FIG. 26(a)

Reference is made to FIGS. 26(a) and (b) of the drawings which depicts a sixth embodiment of the present invention. In this sixth embodiment, like parts are given like reference numerals.

The image forming apparatus of this embodiment shown generally at 800 uses a toner transport mechanism and a toner tank which are different from those used in the first embodiment. Image forming apparatus 800 includes a photosensitive drum 802, a developing device 805, a cleaning device 810, an endless coil spring 820, a driving gear 832, a driving shaft 833, a toner tank 825, and an agitator 828.

In the embodiment, a guiding member 821 of the endless coil spring 820 and the toner tank 825 are integrally formed. When a lid 826 is removed, toner can be supplied from the outside into the toner tank 825.

The toner supply mechanism in the invention can be located at any position in the toner circulation path other than areas for the developing device and the cleaning device. In other words, the toner supply mechanism can be located at an arbitrary position which is adequate for disposition in the view point of the layout of the apparatus. In this embodiment, the toner tank 825 is disposed at a position which is away from driving gear 832 in a plan view.

According to the invention in this embodiment, the toner tank 825 can be disposed so that the interior of the tank constitutes a part of the moving path of the coil spring 820. The agitator 828 employed in this embodiment stirs the toner above the transport path of the endless toner transport mechanism. In this configuration, untransferred toner which has been recovered and fresh toner in the toner tank 825 can be stirred and mixed in a more satisfactory manner.

Figure 27:
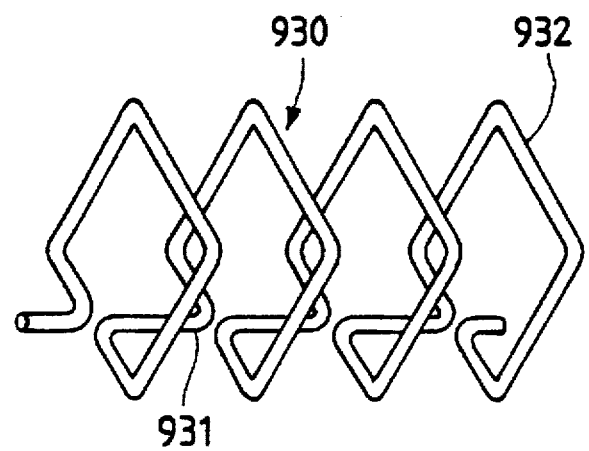
FIG. 27 is a perspective view showing an alternate embodiment of a segment of a toner transport belt which may be used in any of the embodiments of the present invention.
Figure 28:
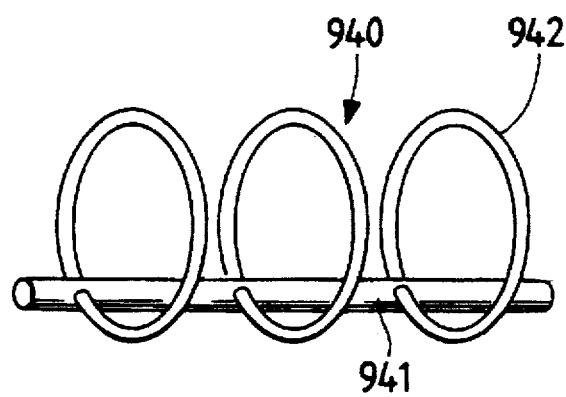
FIG. 28 is a perspective view showing a further alternate embodiment of a segment of a toner transport belt which may be used in any of the embodiments of the present invention.
Figure 29:
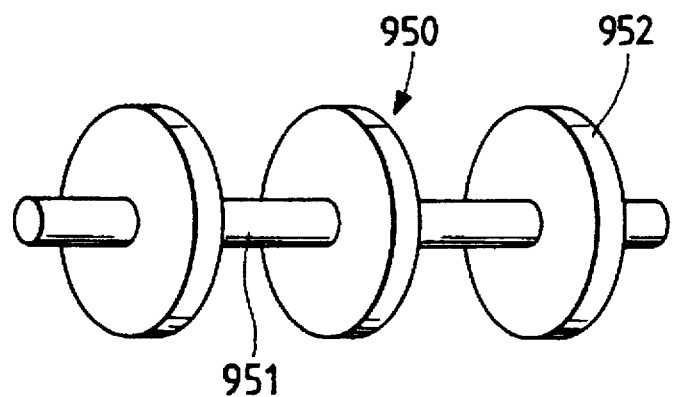
FIG. 29 is a perspective view showing a still further alternate embodiment of a segment of a toner transport belt which may be used in any of the embodiments of the present invention.
Figure 30A:
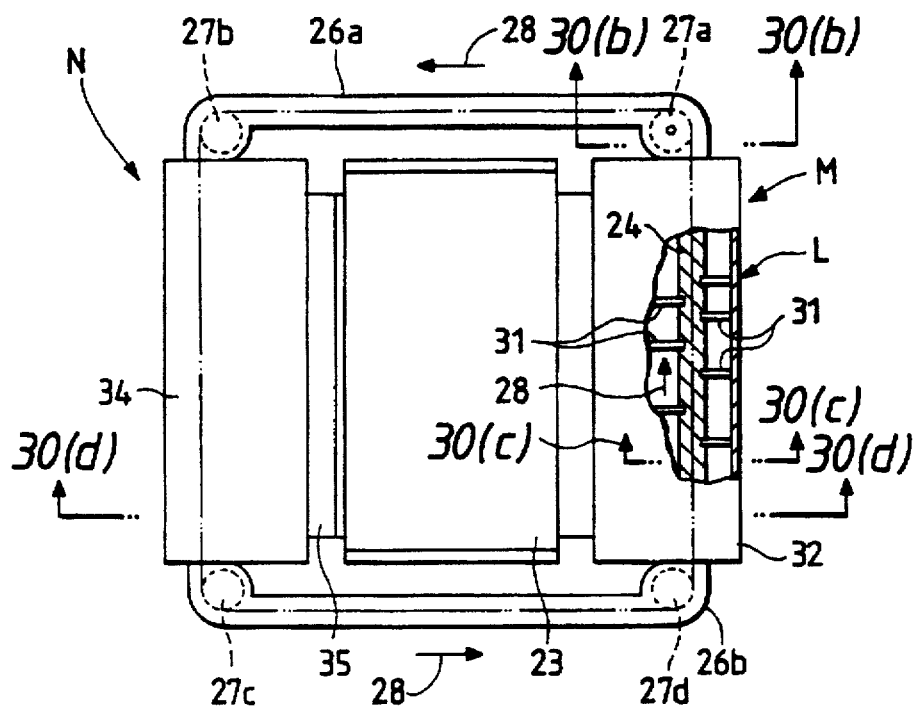
FIG. 30(a) is a plan view showing a prior art toner transport mechanism.
Figure 30B:
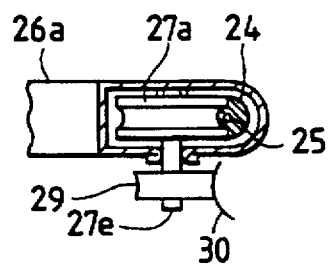
FIG. 30(b) is a cross-sectional view taken along lines 30(b)—30(b) of FIG. 30(a)
Figure 30C:
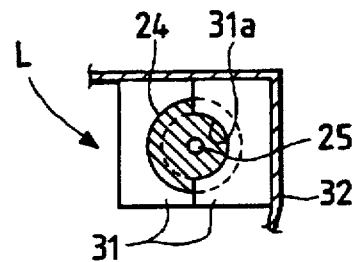
FIG. 30(c) is a cross-sectional view taken along lines 30(c)—30(c) of FIG. 30(a)
Figure 30D:
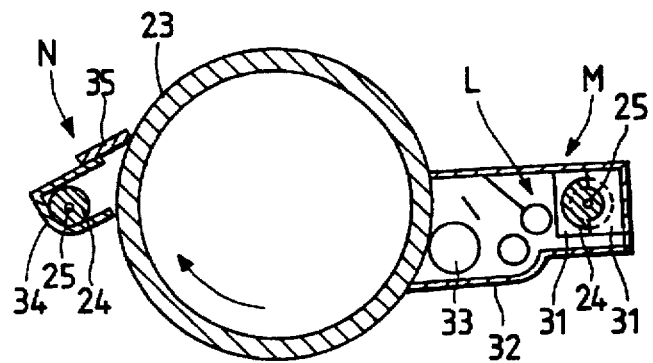
FIG. 30(d) is a cross-sectional view taken along lines 30(d)—30(d) of FIG. 30(a)
Figure 31A:
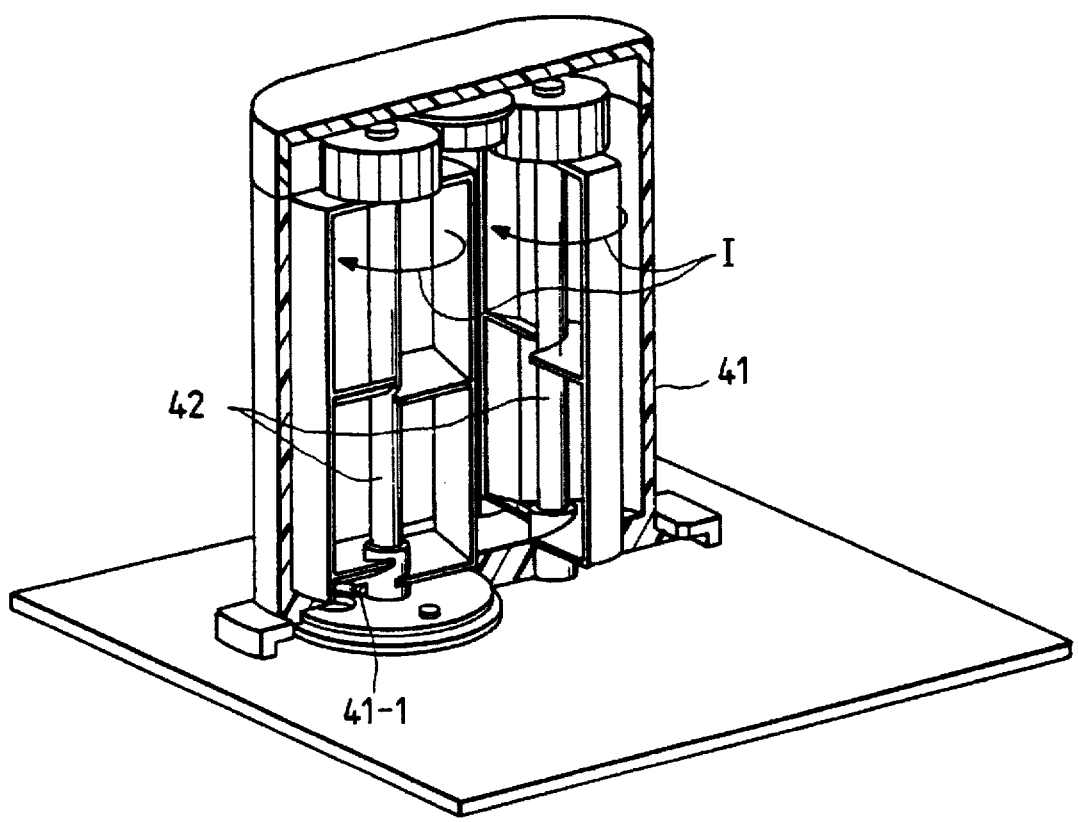
FIG. 31(a) is a perspective view of a toner tank.
Figure 31B:
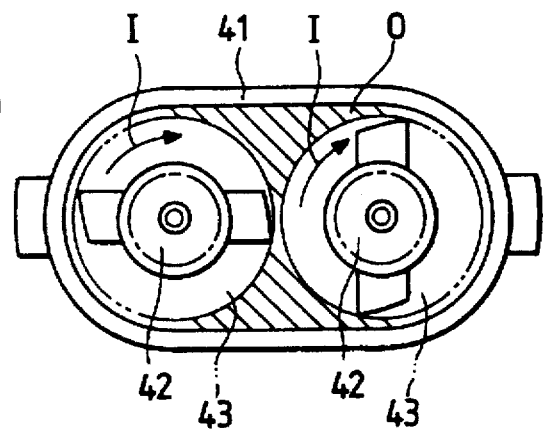
FIG. 31(b) is a view illustrating a relationship between a toner container and the rotation loci of agitators.

Reference is made to FIGS. 27-29 of the drawings which depict alternate embodiments of the toner transport mechanism. In place of the above-mentioned coil springs, toner transport mechanisms shown in FIGS. 27 to 29 may be used as the toner transport mechanism.

In the toner transport mechanism 930 shown in FIG. 27, one wire member 931 is repeatedly bent to form square shapes so that a number of toner transporting portions 932 are arranged at fixed intervals.

In the toner transport mechanism 940 shown in FIG. 28, a number of ring-like wire members 942 which constitute a toner transporting portion are attached at fixed intervals to a flexible wire member 941.

In the toner transport mechanism 950 shown in FIG. 29, a number of disk-like toner transporting members 952 are attached at intervals to a flexible wire member 951.

As described above, according to the invention, an endless toner transport mechanism disposed along a transport path which passes through a developing device and a cleaning device in their respective longitudinal directions. Therefore, the mixing of toner can be enhanced by returning recovered toner to the developing and by supplying fresh toner to the cleaning device, whereby through the reuse of recovered toner the necessary quantity of fresh toner used can be reduced. In the entire lengths of the developing device and the cleaning device in their longitudinal directions, the uniform supply and recovery of toner can be realized by using the toner transport mechanism itself for this supply and recovery. In the processes of transporting toner from the developing device to the cleaning device and from the cleaning device to the developing device, toner being transported can effectively be stirred and mixed by utilizing oscillation or the like generated in the toner transport mechanism, so that a stirring member which is necessary in the developing device of the prior art can be omitted, thereby allowing the size of the developing device and in turn the size of the entire image forming apparatus to be greatly reduced.

Since the toner supply mechanism which is a part of the developing device is disposed in a portion of the moving path of the toner transport mechanisms except where the developing device or the cleaning device are disposed, the size of the developing ,device can be reduced by an amount corresponding to the reduction in size of toner supply mechanism, so that the positional restriction of the developing device is eliminated and the degree of freedom in the layout of the image forming apparatus is increased, thereby enabling the image forming apparatus to be further miniaturized.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A toner tank for an image forming apparatus, comprising:

a toner container for storing toner:

toner stirring means which is housed in said toner container and which has a vertical rotating shaft;

engaging means for receiving an external vertical rotating power shaft for driving said toner stirring means, passing through said toner container;

a toner transport mechanism for transporting toner to and from said toner container;

a toner supply port for supplying said toner to said image forming apparatus; and a lower portion of an inner wall of said toner container having a section shape being almost coincident with an outer periphery of the rotation locus of said toner stirring means.

2. The toner tank of claim 1, wherein said toner transport mechanism passes between said vertical rotating shaft and said inner wall of said toner container.

3. The toner tank of claim 1, wherein said toner stirring means can operate with said toner transport mechanism located within said toner container.

4. The toner tank of claim 1, wherein said stirring means extends substantially the entire vertical height of said toner container.

5. The toner tank of claim 1, wherein said toner container is formed with a conical shape.

6. A toner tank for an image forming apparatus, comprising:

a toner container for storing toner:

toner stirring means which is housed in said toner container and which has a vertical rotating shaft, said stirring means extending substantially the entire vertical height of said toner container;

engaging means for receiving an external vertical rotating power shaft for driving said toner stirring means;

a toner supply port for supplying said toner to said image forming apparatus;

shutter means for closing and opening said toner supply port;

fixing means for fixing said toner container to said image forming apparatus; and a lower portion of an inner wall of said toner container having a section shape being almost coincident with an outer periphery of the rotation locus of said toner stirring means;

wherein said toner stirring means includes at least one agitator having at least one stirring-up vane which extends horizontally.

7. The toner tank as claimed in claim 6 wherein said at least one agitator is provided with at least one vertical vane which extends in the outer periphery of said at least one agitator.

8. The toner tank as claimed in claim 7 wherein said at least one vertical vane is inclined at a predetermined angle to the tangential direction.

9. The toner tank as claimed in claim 8 wherein said predetermined angle is 10 degrees.

10. The toner tank as claimed in claim 6, wherein said at least one stirring-up vane is inclined upward at a predetermined angle to the rotation direction.

11. The toner tank as claimed in claim 10 wherein said predetermined angle is 24 degrees.

12. The toner tank as claimed in claim 6 further comprising:

a lid for hermetically sealing said toner container.

13. The toner tank as claimed in claim 6 wherein said shutter means is formed of a shutter and a shutter presser, for holding said shutter in position for rotation.

14. The toner tank as claimed in claim 6 further comprising:

an inner wall substantially extending from an upper portion of the toner tank to the lower portion of the toner tank and inclined at a predetermined angle.

15. The toner tank as claimed in claim 14, wherein said predetermined angle is 30 degrees.

16. The toner tank as claimed in claim 6, wherein said fixing means permits fixing of said toner container to said image forming apparatus by rotation of said toner container and including a fixed coupling member engagable with said shutter means for displacing said shutter means from a position where said toner supply port is closed to a position where the toner supply port is open during the rotation of said toner container to its fixed position.

17. A toner tank for an image forming apparatus, comprising:

a toner container for storing toner;

toner stirring means which is housed in said toner container and which has a vertical rotating shaft, said stirring means extending substantially the entire vertical height of said toner container;

engaging means for receiving an external vertical rotating power shaft for driving said toner stirring means;

a toner supply port for supplying said toner to said image forming apparatus;

shutter means for closing and opening said toner supply port;

fixing means for fixing said toner container to said image forming apparatus; and a lower portion of an inner wall of said toner container having a section shape being almost coincident with an outer periphery of the rotation locus of said toner stirring means;

said toner stirring means including a first and a second agitator each have at least one stirring-up vane which extends horizontally, and an intermediate gear coupling said first and second agitators.

18. The toner tank as claimed in claim 17 wherein said first and said second agitators have rotation phases which are displaced from each other by 90 degrees.

19. The toner tank as claimed in claim 17 further comprising:

a lid for hermetically sealing said toner container.

20. The toner tank as claimed in claim 19 wherein said shutter means is formed of a shutter and a shutter presser, for holding said shutter in position for rotation.

21. The toner tank as claimed in claim 17 further comprising:

an inner wall substantially extending from an upper portion of the toner tank to the lower portion of the toner tank and inclined at a predetermined angle.

22. The toner tank as claimed in claim 17, wherein said fixing means permits fixing of said toner container to said image forming apparatus by rotation of said toner container and including a fixed coupling member engageable with said shutter means for displacing said shutter means from a position where said toner supply port is closed to a position where the toner supply port is open during the rotation of said toner container to its fixed position.

* * * * *